United States Patent
Summers et al.

(10) Patent No.: US 11,816,757 B1
(45) Date of Patent: Nov. 14, 2023

(54) DEVICE-SIDE CAPTURE OF DATA REPRESENTATIVE OF AN ARTIFICIAL REALITY ENVIRONMENT

(71) Applicant: Meta Platforms Technologies, LLC, Menlo Park, CA (US)

(72) Inventors: Melissa Erin Summers, Charlotte, NC (US); Lindsay Young, San Francisco, CA (US); Arthur Bodolec, New York City, NY (US); Adam Hupp, San Francisco, CA (US); Bryan Alger, Dallas, TX (US); Peter Aubrey Bartholomew Griess, Dallas, TX (US); Nataraja Kumar Koduri, Irving, TX (US); Carl Taylor, Palo Alto, CA (US); Bryan Justice, Sunnyvale, CA (US); Andrea Zeller, Bothell, WA (US); Ayfer Gokalp, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/710,738

(22) Filed: Dec. 11, 2019

(51) Int. Cl.
*G06T 1/60* (2006.01)
*G06F 3/01* (2006.01)
*G06T 17/20* (2006.01)
*G06T 19/00* (2011.01)

(52) U.S. Cl.
CPC .................. *G06T 1/60* (2013.01); *G06F 3/011* (2013.01); *G06F 3/017* (2013.01); *G06T 17/20* (2013.01); *G06T 19/006* (2013.01)

(58) Field of Classification Search
CPC .......... G06T 1/60; G06T 17/20; G06T 19/006; G06F 3/011; G06F 3/017; H04N 5/2357; H04N 5/23238
See application file for complete search history.

(56) References Cited

U.S. PATENT DOCUMENTS

| | | | | |
|---|---|---|---|---|
| 5,065,436 | A * | 11/1991 | Matsumura | H05G 1/60 382/131 |
| 5,787,487 | A * | 7/1998 | Hashimoto et al. | G06F 12/08 710/68 |
| 7,324,844 | B1 * | 1/2008 | Levine et al. | A61N 1/368 600/510 |
| 8,128,500 | B1 * | 3/2012 | Borst et al. | A63F 13/335 446/268 |
| 9,129,430 | B2 * | 9/2015 | Salter et al. | G06F 3/167 |
| 9,395,883 | B1 * | 7/2016 | Olsson et al. | G06Q 10/10 |
| 9,495,783 | B1 * | 11/2016 | Samarasekera et al. | G06T 7/246 |

(Continued)

*Primary Examiner* — Charles L Beard
(74) *Attorney, Agent, or Firm* — Shumaker & Sieffert, P.A.

(57) ABSTRACT

The disclosure describes artificial reality systems and techniques for saving and exporting artificial reality data. For example, an artificial reality system includes an application engine configured to generate artificial reality content based on a pose of a user participating in an artificial reality environment and a head-mounted display (HMD) configured to output the artificial reality content to the user. The HMD includes a buffer configured to hold data representative of the artificial reality environment during a time window on a rolling basis and a capture engine configured to, in response to user input, capture the data representative of the artificial reality environment held in the buffer at a point in time at which the user input was received.

17 Claims, 9 Drawing Sheets

(56) References Cited

U.S. PATENT DOCUMENTS

| | | | |
|---|---|---|---|
| 9,781,342 B1* | 10/2017 | Turley et al. | H04N 23/698 |
| 9,898,863 B2 | 2/2018 | Miyazaya et al. | G06F 3/167 |
| 9,959,905 B1* | 5/2018 | Sevigny | H04N 23/6811 |
| 10,148,875 B1* | 12/2018 | Chen | H04N 21/631 |
| 10,304,200 B2* | 5/2019 | Menozzi | G01C 21/1654 |
| 10,410,441 B2* | 9/2019 | Jordan et al. | H04N 23/90 |
| 10,482,659 B2* | 11/2019 | Li et al. | G06T 19/006 |
| 10,491,819 B2* | 11/2019 | Corcoran | H04N 5/247 |
| 10,535,199 B1* | 1/2020 | Bond et al. | G06T 15/08 |
| 10,551,050 B1* | 2/2020 | Park et al. | G06T 19/006 |
| 10,580,218 B1* | 3/2020 | Viner | G06T 19/006 |
| 10,602,300 B1* | 3/2020 | Lyren | G06F 3/011 |
| 10,602,302 B1* | 3/2020 | Lyren | G06F 3/011 |
| 10,645,293 B1* | 5/2020 | Cabral et al. | H04N 23/63 |
| 10,762,878 B1* | 9/2020 | Gomez Diaz et al. | G09G 5/003 |
| 10,776,993 B1* | 9/2020 | Chen et al. | H04N 23/60 |
| 10,848,738 B1* | 11/2020 | Petrangeli et al. | H04N 23/64 |
| 10,861,422 B1* | 12/2020 | Seiler et al. | G09G 5/37 |
| 10,877,622 B2* | 12/2020 | Romano et al. | G06F 3/04815 |
| 10,922,850 B1* | 2/2021 | Harrison et al. | G06N 3/10 |
| 11,048,760 B1* | 6/2021 | Bhushan et al. | G06F 3/04815 |
| 11,138,803 B1* | 10/2021 | Abdel-Wahab et al. | G06F 3/011 |
| 11,159,634 B1* | 10/2021 | Deshpande et al. | G06F 9/546 |
| 11,531,402 B1* | 12/2022 | Stolzenberg | G06F 19/006 |
| 11,615,579 B1* | 3/2023 | Thivierge | G06T 15/205 345/582 |
| 2001/0056574 A1* | 12/2001 | Richards | H04N 7/002 348/E7.071 |
| 2002/0180725 A1* | 12/2002 | Simmonds et al. | G06F 3/1438 345/213 |
| 2004/0240393 A1* | 12/2004 | Nishida et al. | H04L 61/2521 370/392 |
| 2010/0257187 A1* | 10/2010 | Fontijn et al. | G06F 16/78 707/756 |
| 2012/0062702 A1* | 3/2012 | Jiang et al. | G06T 19/006 348/46 |
| 2012/0075343 A1* | 3/2012 | Chen et al. | G06T 19/006 345/633 |
| 2012/0206452 A1* | 8/2012 | Geisner et al. | G06F 3/013 345/419 |
| 2013/0063487 A1* | 3/2013 | Spiegel et al. | G06Q 30/02 345/633 |
| 2013/0083011 A1* | 4/2013 | Geisner et al. | G09G 5/00 345/419 |
| 2014/0043365 A1* | 2/2014 | Fialho et al. | G06F 3/04883 345/633 |
| 2014/0067869 A1* | 3/2014 | Fateh et al. | G06T 1/20 707/796 |
| 2014/0192085 A1* | 7/2014 | Kim | G06V 20/20 345/633 |
| 2014/0192087 A1* | 7/2014 | Frost | G06F 3/0325 345/633 |
| 2014/0267403 A1* | 9/2014 | Maciocci et al. | G06T 19/006 345/633 |
| 2014/0364209 A1* | 12/2014 | Perry | A63F 13/98 463/31 |
| 2014/0375683 A1* | 12/2014 | Salter et al. | G06T 19/006 345/633 |
| 2015/0046296 A1* | 2/2015 | Hart | G06Q 30/0242 705/27.2 |
| 2015/0109336 A1* | 4/2015 | Hayakawa et al. | G06T 19/006 345/633 |
| 2015/0109481 A1* | 4/2015 | Hayakawa | H04N 5/2224 348/239 |
| 2015/0153571 A1* | 6/2015 | Ballard et al. | H04N 23/61 345/8 |
| 2016/0026242 A1* | 1/2016 | Burns et al. | G02B 27/017 345/633 |
| 2016/0035140 A1* | 2/2016 | Bickerstaff et al. | G06T 19/006 345/633 |
| 2016/0048725 A1* | 2/2016 | Holz et al. | G06F 3/011 345/156 |
| 2016/0110921 A1* | 4/2016 | Takahashi et al. | G02B 27/0172 345/633 |
| 2016/0127710 A1* | 5/2016 | Saban et al. | H04N 5/2624 386/241 |
| 2016/0171773 A1* | 6/2016 | Hara | G06V 20/20 345/633 |
| 2016/0216518 A1* | 7/2016 | Raghoebardajal et al. | G09G 3/003 |
| 2016/0225072 A1* | 8/2016 | Brady et al. | G07C 5/008 |
| 2016/0253841 A1* | 9/2016 | Ur et al. | G06T 19/006 345/633 |
| 2016/0262608 A1* | 9/2016 | Krueger | G16H 40/63 |
| 2016/0300388 A1* | 10/2016 | Stafford et al. | A63F 13/69 |
| 2016/0306431 A1* | 10/2016 | Stafford et al. | G02B 27/017 |
| 2016/0313734 A1* | 10/2016 | Enke | G08G 5/0039 |
| 2016/0321841 A1* | 11/2016 | Christen et al. | G02B 27/017 |
| 2016/0337630 A1* | 11/2016 | Raghoebardajal et al. | A63F 13/212 |
| 2016/0343107 A1* | 11/2016 | Newman et al. | G06T 3/0018 |
| 2017/0052595 A1* | 2/2017 | Poulos et al. | G06F 3/013 |
| 2017/0053545 A1* | 2/2017 | Yang et al. | G06F 3/011 |
| 2017/0075942 A1* | 3/2017 | Childs et al. | G06F 12/023 |
| 2017/0076425 A1* | 3/2017 | Folse | G09G 5/34 |
| 2017/0108918 A1* | 4/2017 | Boesen | H04R 1/1016 |
| 2017/0151484 A1* | 6/2017 | Reilly et al. | A63B 69/0024 |
| 2017/0237789 A1* | 8/2017 | Harner et al. | H04L 65/4015 709/205 |
| 2017/0270562 A1* | 9/2017 | Ben-Rubi et al. | G06F 16/435 |
| 2017/0278486 A1* | 9/2017 | Ishikawa et al. | G06T 11/60 |
| 2017/0289219 A1* | 10/2017 | Khalid et al. | H04N 21/816 |
| 2017/0295446 A1* | 10/2017 | Thagadur Shivappa | H04S 7/304 |
| 2017/0309079 A1* | 10/2017 | Naples et al. | G06V 20/20 |
| 2017/0323449 A1* | 11/2017 | Aonuma et al. | G06T 19/006 |
| 2017/0353410 A1* | 12/2017 | Gonzales | H04L 51/02 |
| 2017/0354502 A1* | 12/2017 | Ryu | C08J 3/20 |
| 2018/0032130 A1* | 2/2018 | Meglan | A61B 34/25 |
| 2018/0116601 A1* | 5/2018 | Yi et al. | G05D 23/20 |
| 2018/0124497 A1* | 5/2018 | Boesen | H04W 4/025 |
| 2018/0160108 A1* | 6/2018 | Park et al. | H04N 13/172 |
| 2018/0160123 A1* | 6/2018 | Van Der Auwera et al. | H04N 19/167 |
| 2018/0182172 A1* | 6/2018 | Vinmani et al. | G06V 20/20 |
| 2018/0183696 A1* | 6/2018 | Chang et al. | H04L 47/28 |
| 2018/0197624 A1* | 7/2018 | Robaina et al. | A61B 90/37 |
| 2018/0199029 A1* | 7/2018 | Van Der Auwera et al. | H04N 5/2628 |
| 2018/0213359 A1* | 7/2018 | Reinhardt et al. | G06F 16/907 |
| 2018/0232952 A1* | 8/2018 | Hiranandani et al. | G06Q 30/0641 |
| 2018/0249086 A1* | 8/2018 | Ozawa et al. | G06F 3/147 |
| 2018/0253900 A1* | 9/2018 | Finding et al. | G06T 19/006 |
| 2018/0268219 A1* | 9/2018 | Miller et al. | G06Q 30/0201 |
| 2018/0268517 A1* | 9/2018 | Coban et al. | H04N 19/172 |
| 2018/0276789 A1* | 9/2018 | Van Der Auwera et al. | G06T 7/11 |
| 2018/0276826 A1* | 9/2018 | Van Der Auwera et al. | H04N 13/194 |
| 2018/0284453 A1* | 10/2018 | Irvin et al. | G06T 19/006 |
| 2018/0284885 A1* | 10/2018 | Kim | G06F 3/013 |
| 2018/0293169 A1* | 10/2018 | Beard et al. | G06F 12/0875 |
| 2018/0307303 A1* | 10/2018 | Powderly et al. | G02B 27/0172 |
| 2018/0308287 A1* | 10/2018 | Daniels et al. | G06T 19/20 |
| 2018/0315243 A1* | 11/2018 | Mahler et al. | G06F 3/017 |
| 2018/0324404 A1* | 11/2018 | Sevigny | G06T 11/60 |
| 2018/0329209 A1* | 11/2018 | Nattukallingal | G02B 27/01 |
| 2018/0329482 A1* | 11/2018 | Woo et al. | G06F 3/0346 |
| 2018/0332219 A1* | 11/2018 | Corcoran | G06V 10/751 |
| 2018/0341323 A1* | 11/2018 | Mate et al. | A63F 13/355 |
| 2018/0350103 A1* | 12/2018 | Skidmore et al. | G06T 7/73 |
| 2018/0350150 A1* | 12/2018 | Powderly et al. | G06F 3/0213 |
| 2018/0357749 A1* | 12/2018 | Young et al. | G06F 3/011 |
| 2018/0357752 A1* | 12/2018 | Ho et al. | G09G 5/377 |
| 2018/0361240 A1* | 12/2018 | Ikenoue et al. | G06T 19/003 |
| 2018/0373325 A1* | 12/2018 | Rosso et al. | G06F 3/013 |
| 2018/0376076 A1* | 12/2018 | Park et al. | H04N 23/698 |
| 2019/0005724 A1* | 1/2019 | Pahud et al. | G06F 3/011 |
| 2019/0012838 A1* | 1/2019 | Uchida | G06T 7/73 |
| 2019/0012839 A1* | 1/2019 | Wang | G06T 19/006 |
| 2019/0019378 A1* | 1/2019 | Greiner et al. | G03B 17/54 |
| 2019/0028722 A1* | 1/2019 | Choi et al. | G06T 3/4015 |
| 2019/0041651 A1* | 2/2019 | Kiemele et al. | G09G 3/3611 |
| 2019/0042834 A1* | 2/2019 | Gavino et al. | G06T 3/608 |
| 2019/0043167 A1* | 2/2019 | Steyskal et al. | G06T 3/4038 |
| 2019/0043448 A1* | 2/2019 | Thakur et al. | G09G 5/001 |
| 2019/0073109 A1* | 3/2019 | Zhang et al. | G06F 3/013 |

(56) References Cited

U.S. PATENT DOCUMENTS

| | | | |
|---|---|---|---|
| 2019/0102956 A1* | 4/2019 | Ishihara et al. | G06V 20/64 |
| 2019/0108578 A1* | 4/2019 | Spivack et al. | G09B 5/065 |
| 2019/0114061 A1* | 4/2019 | Daniels et al. | G06F 15/16 |
| 2019/0130622 A1* | 5/2019 | Hoover et al. | G06F 3/017 |
| 2019/0164334 A1* | 5/2019 | Denman et al. | G06T 19/006 |
| 2019/0188450 A1* | 6/2019 | Spivack et al. | G06V 40/103 |
| 2019/0196674 A1* | 6/2019 | Baig et al. | G06F 3/0482 |
| 2019/0197786 A1* | 6/2019 | Molyneaux et al. | G06T 15/20 |
| 2019/0199993 A1* | 6/2019 | Babu J D et al. | H04N 13/122 |
| 2019/0214709 A1* | 7/2019 | Frishman et al. | G02B 27/017 |
| 2019/0215503 A1* | 7/2019 | Monson et al. | G06F 3/013 |
| 2019/0222776 A1* | 7/2019 | Carter et al. | G06T 7/70 |
| 2019/0230317 A1* | 7/2019 | Sheftel et al. | G06T 19/003 |
| 2019/0242952 A1* | 8/2019 | Schneider et al. | G06F 3/017 |
| 2019/0243530 A1* | 8/2019 | De Ridder et al. | G06F 3/04815 |
| 2019/0244431 A1* | 8/2019 | Skidmore | G06K 19/06037 |
| 2019/0272674 A1* | 9/2019 | Comer et al. | G06F 3/04815 |
| 2019/0287080 A1* | 9/2019 | Penilla et al. | G06F 9/00 |
| 2019/0289341 A1* | 9/2019 | Vasco de Oliveira Redol | G02B 27/017 |
| 2019/0304139 A1* | 10/2019 | Joshi et al. | G06T 9/001 |
| 2019/0304190 A1* | 10/2019 | Johnson et al. | G06F 3/013 |
| 2019/0306490 A1* | 10/2019 | Li et al. | H04N 13/366 |
| 2019/0311471 A1* | 10/2019 | Kurabayashi | G06T 7/0002 |
| 2019/0318404 A1* | 10/2019 | LaMontagne | G06T 19/006 |
| 2019/0318539 A1* | 10/2019 | Weston | H04L 63/08 |
| 2019/0353904 A1* | 11/2019 | Ardovino | G06F 3/013 |
| 2019/0356849 A1* | 11/2019 | Sapienza et al. | H04N 5/374 |
| 2019/0362557 A1* | 11/2019 | Lacey et al. | G06F 3/167 |
| 2019/0369722 A1* | 12/2019 | Lehtiniemi et al. | G06F 3/0304 |
| 2019/0369837 A1* | 12/2019 | Davis | H04N 7/157 |
| 2019/0370544 A1* | 12/2019 | Wright, Jr. et al. | G06Q 10/20 |
| 2020/0004328 A1* | 1/2020 | Blume et al. | G06F 3/012 |
| 2020/0029006 A1* | 1/2020 | Levy et al. | G06T 19/006 |
| 2020/0035003 A1* | 1/2020 | Canberk et al. | G06T 19/006 |
| 2020/0035024 A1* | 1/2020 | Price et al. | G06T 19/006 |
| 2020/0037943 A1* | 2/2020 | Chaja et al. | A61B 5/165 |
| 2020/0058256 A1* | 2/2020 | Seibert et al. | G06F 3/017 |
| 2020/0066040 A1* | 2/2020 | Unnerstall et al. | G06Q 20/102 |
| 2020/0073531 A1* | 3/2020 | Romano et al. | G02B 27/017 |
| 2020/0074181 A1* | 3/2020 | Chang et al. | H04N 21/8456 |
| 2020/0074738 A1* | 3/2020 | Hare et al. | G06F 3/04845 |
| 2020/0082548 A1* | 3/2020 | Graham et al. | G02B 27/0172 |
| 2020/0082600 A1* | 3/2020 | Jones et al. | G06T 7/70 |
| 2020/0090407 A1* | 3/2020 | Miranda et al. | H04N 7/33 |
| 2020/0111232 A1* | 4/2020 | Bleyer et al. | G06T 7/564 |
| 2020/0111256 A1* | 4/2020 | Bleyer et al. | G06F 3/011 |
| 2020/0125244 A1* | 4/2020 | Feinstein | G06F 3/04883 |
| 2020/0125322 A1* | 4/2020 | Wilde | G06F 1/163 |
| 2020/0128348 A1* | 4/2020 | Eronen et al. | H04R 3/005 |
| 2020/0133300 A1* | 4/2020 | Iyer et al. | G02B 27/017 |
| 2020/0137290 A1* | 4/2020 | Lee et al. | H04N 25/583 |
| 2020/0162712 A1* | 5/2020 | Yun | H04N 13/264 |
| 2020/0162851 A1* | 5/2020 | Wilde | G02B 27/017 |
| 2020/0168001 A1* | 5/2020 | Yang et al. | G06V 20/20 |
| 2020/0174552 A1* | 6/2020 | Stafford et al. | G01C 19/5783 |
| 2020/0175768 A1* | 6/2020 | Lake et al. | G06F 3/016 |
| 2020/0184934 A1* | 6/2020 | Choi et al. | G06T 1/60 |
| 2020/0188792 A1* | 6/2020 | Stephens et al. | A63F 13/47 |
| 2020/0193708 A1* | 6/2020 | Maggiore et al. | H04W 4/029 |
| 2020/0193976 A1* | 6/2020 | Cartwright et al. | G06F 3/011 |
| 2020/0201045 A1* | 6/2020 | Liu et al. | H04N 23/56 |
| 2020/0221147 A1* | 7/2020 | Batra et al. | H04N 21/23805 |
| 2020/0226835 A1* | 7/2020 | Farchy et al. | H04L 67/04 |
| 2020/0228774 A1* | 7/2020 | Kar et al. | H04N 13/111 |
| 2020/0233453 A1* | 7/2020 | Hatfield et al. | G06F 3/011 |
| 2020/0241291 A1* | 7/2020 | Walker | G06F 3/167 |
| 2020/0241635 A1* | 7/2020 | Cohen | G06V 40/19 |
| 2020/0242848 A1* | 7/2020 | Ambler et al. | G06T 19/006 |
| 2020/0244875 A1* | 7/2020 | Lee et al. | H04N 23/80 |
| 2020/0245032 A1* | 7/2020 | Murtaza et al. | H04N 21/44218 |
| 2020/0252532 A1* | 8/2020 | Shimokawa et al. | H04N 23/72 |
| 2020/0252602 A1* | 8/2020 | Oonishi et al. | G02B 27/017 |
| 2020/0267296 A1* | 8/2020 | Usui | H04N 23/73 |
| 2020/0292823 A1* | 9/2020 | Niforatos et al. | G06F 40/30 |
| 2020/0302682 A1* | 9/2020 | Aksoy et al. | G06T 19/006 |
| 2020/0307437 A1* | 10/2020 | Thieberger et al. | B62D 47/006 |
| 2020/0326831 A1* | 10/2020 | Marr | G06F 3/04883 |
| 2020/0329266 A1* | 10/2020 | Takaku | H04N 21/234327 |
| 2020/0357183 A1* | 11/2020 | Weber | G06F 3/013 |
| 2020/0366836 A1* | 11/2020 | Hyaku et al. | H04N 23/698 |
| 2020/0367970 A1* | 11/2020 | Qiu et al. | A61B 90/36 |
| 2020/0372718 A1* | 11/2020 | Molyneaux et al. | G06T 19/006 |
| 2020/0388178 A1* | 12/2020 | Barbuto et al. | A61B 5/165 |
| 2020/0388246 A1* | 12/2020 | Chrapek et al. | G06F 3/011 |
| 2020/0394843 A1* | 12/2020 | Ramachandra Iyer | G06F 16/434 |
| 2020/0401217 A1* | 12/2020 | Matsuoka et al. | G06F 1/163 |
| 2020/0404177 A1* | 12/2020 | Sapienza et al. | G02B 27/017 |
| 2020/0404447 A1* | 12/2020 | Yerli | G06F 16/9535 |
| 2020/0410766 A1* | 12/2020 | Swaminathan | G06F 17/00 |
| 2021/0012113 A1* | 1/2021 | Petill et al. | G06F 1/1694 |
| 2021/0019036 A1* | 1/2021 | Wang et al. | G06F 3/0346 |
| 2021/0043069 A1* | 2/2021 | De Vries et al. | H04N 7/183 |
| 2021/0044747 A1* | 2/2021 | Panchagnula et al. | H04N 19/132 |
| 2021/0049824 A1* | 2/2021 | Edwards | G02B 27/017 |
| 2021/0055787 A1* | 2/2021 | Chhabra et al. | G06F 3/012 |
| 2021/0065333 A1* | 3/2021 | Ogawa | G06T 7/73 |
| 2021/0072940 A1* | 3/2021 | Kanzaki et al. | G06F 3/147 |
| 2021/0102820 A1* | 4/2021 | Le et al. | G06F 1/1694 |
| 2021/0103449 A1* | 4/2021 | Terpstra et al. | G06F 21/31 |
| 2021/0125295 A1* | 4/2021 | Kim et al. | G06T 17/05 |
| 2021/0125417 A1* | 4/2021 | Ando | H04N 5/66 |
| 2021/0125664 A1* | 4/2021 | Holland et al. | G06F 3/013 |
| 2021/0133991 A1* | 5/2021 | Tamama et al. | G06F 30/30 |
| 2021/0142509 A1* | 5/2021 | Zhang et al. | G06T 19/006 |
| 2021/0142575 A1* | 5/2021 | Taylor et al. | H04N 13/268 |
| 2021/0157312 A1* | 5/2021 | Cella et al. | G06N 5/04 |
| 2021/0157390 A1* | 5/2021 | Yardi et al. | G06F 1/3287 |
| 2021/0176399 A1* | 6/2021 | Byon et al. | H04N 23/685 |
| 2021/0195157 A1* | 6/2021 | Stokking et al. | H04N 13/111 |
| 2021/0204087 A1* | 7/2021 | Lyren | H04S 7/40 |
| 2021/0210125 A1* | 7/2021 | Song | G06F 9/3893 |
| 2021/0216773 A1* | 7/2021 | Bohannon et al. | G06V 20/20 |
| 2021/0240985 A1* | 8/2021 | Phillips et al. | G06T 19/20 |
| 2021/0320955 A1* | 10/2021 | Kolan | H04L 65/605 |
| 2021/0327145 A1* | 10/2021 | Noorkami et al. | H04N 21/23412 |
| 2021/0373654 A1* | 12/2021 | Franci Rodon et al. | G06F 3/012 |
| 2021/0397252 A1* | 12/2021 | Nakade et al. | G06F 3/04815 |
| 2021/0398360 A1* | 12/2021 | Drummond et al. | G06F 9/451 |
| 2021/0407210 A1* | 12/2021 | Maggiore et al. | H04W 4/029 |
| 2022/0028172 A1* | 1/2022 | Yip et al. | H04L 65/1069 |
| 2022/0165037 A1* | 5/2022 | Zavesky et al. | H04L 67/131 |
| 2022/0207838 A1* | 6/2022 | Anvaripour et al. | H04L 51/52 |
| 2022/0207869 A1* | 6/2022 | Goodrich | G06V 20/20 |
| 2022/0229534 A1* | 7/2022 | Terre et al. | G06F 3/04815 |
| 2022/0310087 A1* | 9/2022 | Mukhi et al. | G06F 3/011 |
| 2023/0089622 A1* | 3/2023 | Verma | G06F 16/9558 |

\* cited by examiner

DEVICE-SIDE CAPTURE OF DATA REPRESENTATIVE OF AN ARTIFICIAL REALITY ENVIRONMENT

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely include content that is generated by the system or may include generated content combined with captured content (e.g., real-world video and/or images).

SUMMARY

In general, the disclosure describes an artificial reality (AR) system including a head-mounted display (HMD), and in some examples a peripheral device associated with the HMD, configured to perform full state capture of an AR environment from the perspective of the HMD. In some examples, the AR system may include a plurality of HMDs each executing an AR application to enable users of the HMDs to interact within a common AR experience, e.g., a video game, a virtual conference call, a training program, or a social meeting. A user of one of the HMDs that is participating in the AR environment may capture and, in some cases, replay and/or share the video and/or audio data representing the AR environment from the perspective of the user's HMD.

According to the disclosed techniques, the HMD, and/or the peripheral device associated with the HMD, includes a rolling buffer configured to hold the data representative of the AR environment from a perspective of the HMD over a period of time. The rolling buffer of the HMD may continuously hold or store the most recent moments of the AR environment in a moving window such that, as time moves forward, the older data is flushed from the buffer and deleted to make room for new data. The inclusion of the rolling buffer enables the HMD, upon request by the user, to perform a retroactive capture of the data currently held in the buffer in order to save the most recent few moments of the AR environment for a longer period of time. Once the data is captured and saved, the user may replay and/or share the captured segment or "clip" of the AR environment.

In some examples, an artificial reality system includes an application engine configured to generate artificial reality content based on a pose of a user participating in an artificial reality environment and a head-mounted display (HMD) configured to output the artificial reality content to the user. The HMD includes a buffer configured to hold data representative of the artificial reality environment during a time window on a rolling basis and a capture engine configured to, in response to user input, capture the data representative of the artificial reality environment held in the buffer at a point in time at which the user input was received.

In some examples, a method includes generating, using an application engine, artificial reality content based on a pose of a user participating in an artificial reality environment, outputting, using a head-mounted display (HMD), the artificial reality content to the user, holding, using a buffer of the HMD, data representative of the artificial reality environment during a time window on a rolling basis, and capturing, by a capture engine of the HMD in response to user input, the data representative of the artificial reality environment held in the buffer at a point in time at which the user input was received.

In some examples, a non-transitory computer-readable medium includes instructions that, when executed, cause one or more processors to generate artificial reality content based on a pose of a user participating in an artificial reality environment, output the artificial reality content to the user, hold data representative of the artificial reality environment during a time window on a rolling basis, and capture the data representative of the artificial reality environment at a point in time at which the user input was received.

Further details of one or more examples of this disclosure are set forth in the accompanying drawings and in the description below. Other features, objects, and advantages will be apparent from the description and drawings, and from the claims.

DETAILED DESCRIPTION

Figure 1A:
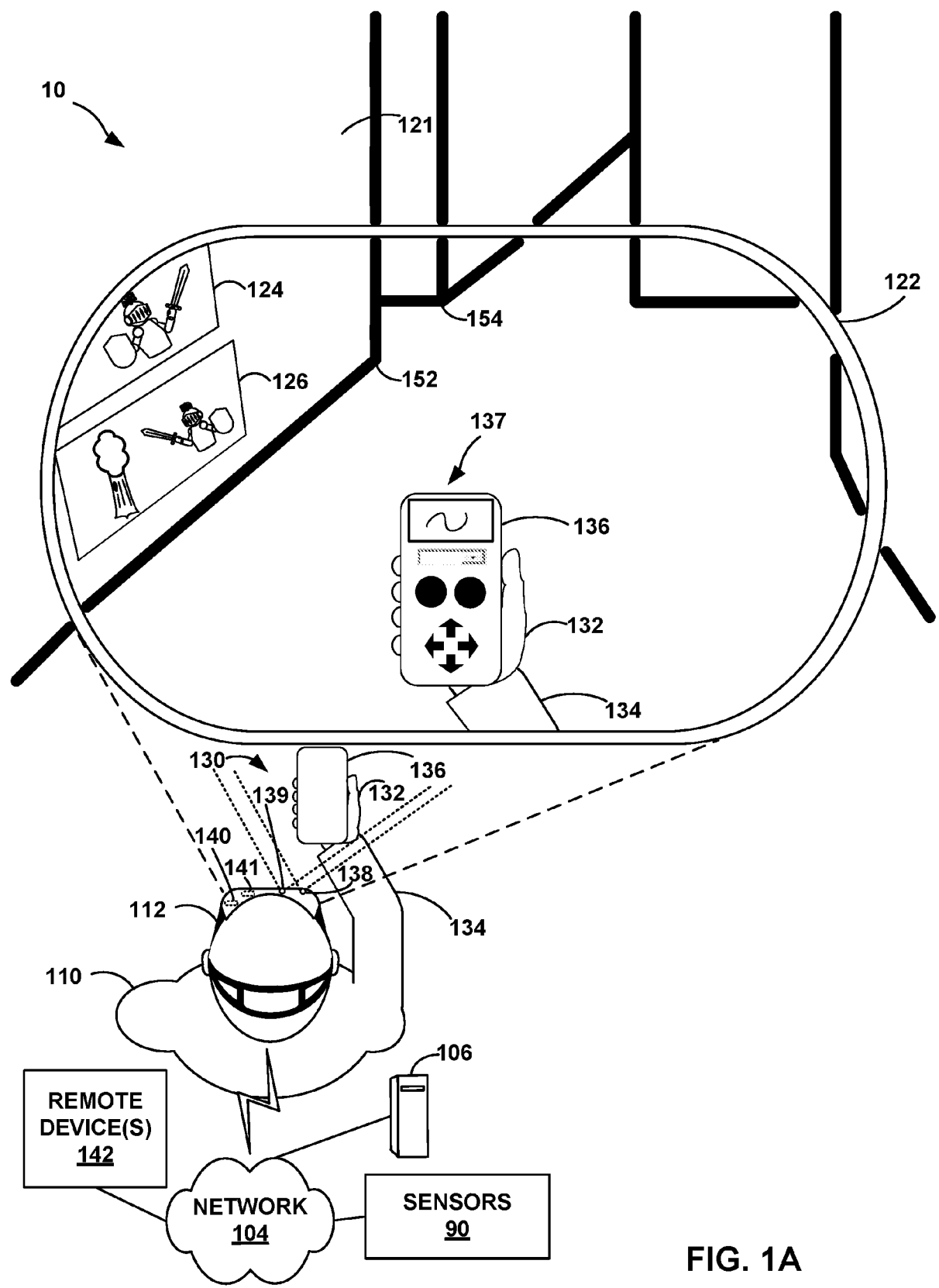
FIG. 1A is a conceptual diagram illustrating an artificial reality system for presenting a virtual scene to a user, in accordance with one or more techniques of this disclosure.

FIG. 1A is a conceptual diagram illustrating an artificial reality system 10 for presenting a virtual scene to a user, in accordance with one or more techniques of this disclosure. In the example of FIG. 1A, artificial reality system 10 includes head mounted display (HMD) 112, peripheral device 136, and may in some examples include one or more external sensors 90 and/or console 106.

As shown, HMD 112 is typically worn by user 110 and includes a display unit and optical assembly for presenting artificial reality content 122 to user 110. In addition, HMD 112 includes one or more sensors (e.g., accelerometers) for tracking motion of the HMD 112. HMD 112 may include one or more "inside-out" image capture devices 138 for capturing image data representative of the physical environment surrounding user 110. Additionally, or alternatively, HMD 112 may include one or more "pass-through" image capture devices 139 configured to capture real-world image data such that artificial reality system 10 may pass at least some of the real-world image data to user 110 via HMD 112. In some examples, a resolution of the image data captured by pass-through image capture devices 139 is greater than a resolution of the image data captured by inside-out image capture devices 138. The image data captured by pass-through image capture devices 139 may include image data captured in color and at a higher-resolution than the black-and-white image data captured by inside-out image capture devices 138.

Additionally, HMD 112 may include one or more depth sensors which collect depth data indicative of a depth of one or more points and/or objects in the real-world, three-dimensional (3D) physical environment of user 110. In some examples, the depth sensors may include a set of at least two inside-out image capture devices 138. In other examples, the depth sensors may include stand-alone depth sensor devices. For example, the depth data may indicate that corner 152 is closer to user 110 than corner 154 (e.g., a depth of corner 152 is less than a depth of corner 154). Although illustrated as a head-mounted display, artificial reality system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or any combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may include a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, 3D physical environment (e.g., on a surface of a physical object).

In this example, peripheral device 136 is a physical, real-world device having a surface on which artificial reality system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other handheld device. In some examples, peripheral device 136 may be a smartwatch, smart ring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, artificial reality system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, 3D physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. In some examples, the artificial reality application may generate a 3D mesh of the physical environment of user 110 using the depth data captured by the one or more depth sensors of HMD 112. In some examples, the 3D mesh may include a set of data points, where a location of each data point of the set of data points relative to each other data point of the set of data points is known. For example, the 3D mesh may indicate that one or more data points representing corner 152 is closer to user 110 than one or more data points representing corner 154. After generating the 3D mesh, the artificial reality application may overlay at least some of the real-world image data captured by pass-through image capture devices 139 on the 3D mesh in order to generate a 3D scene of the physical environment of user 110. Additionally, the artificial reality application may generate artificial reality content 122 as an overlay to the 3D scene of the physical environment for display on a display unit of HMD 112.

In some examples, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application may determine a current pose for the frame of reference of HMD 112 and, in accordance with the current pose, renders the artificial reality content 122.

The artificial reality application may trigger generation and rendering of virtual content items based on a current field of view 130 of user 110, as may be determined by near real-time gaze tracking of the user, or other conditions. More specifically, pass-through image capture devices 139 of HMD 112 capture image data representative of objects in the real-world, 3D physical environment that are within a field of view 130 of pass-through image capture devices 139. Field of view 130 typically corresponds with the viewing perspective of HMD 112. In some examples, the artificial reality application presents artificial reality content 122 including mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as objects 124, 126, within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, the artificial reality application performs object recognition within image data captured by inside-out image capture devices 138 of HMD 112 to identify peripheral device 136, hand 132, including optionally identifying individual fingers or the thumb, and/or all or portions of arm 134 of user 110. Further, the artificial reality application tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

In according with the techniques of this disclosure, HMD 112 includes a buffer 140 that includes a "rolling" or first-in, first-out (FIFO) buffer configured to hold or store data for a predetermined time window. In some examples, the artificial reality application is configured to cause buffer 140 of HMD 112 to hold (e.g., "save") data representative of the artificial reality environment from a perspective of HMD 112 during a time window on a rolling basis. In order to save the data representative of the artificial reality environment form the perspective of HMD 112, buffer 140 may be configured to save "full state" data including a 360-degree view of the artificial reality environment from a position of HMD 112. The full state data may be more comprehensive that the artificial reality content 122 displayed to user 110 using HMD 112. For example, HMD 112 may display artificial reality content 122 based on a pose of user 110 to include one or more physical objects within field of view 130 and/or one or more virtual objects overlaid on physical objects within field of view 130. Since full state data includes a 360-degree view of the artificial reality environment, the data representative of the artificial reality environment from a perspective of HMD 112 may include one or more objects and/or users that are outside of the field of view 130 of HMD 112 during the window of time. The data representative of the artificial reality environment may include any one or a combination of video data, audio data, and other types of data such as data for causing one or more devices to perform mechanical movements. In this way, the data representative of the artificial reality environment that is saved to buffer 140 may represent a "clip" of an artificial reality experience provided to one or more users over the window of time.

Buffer 140 represents a rolling buffer such that the data saved to buffer 140 is updated as time moves forward. The data representative of the artificial reality environment which is saved to buffer 140 may represent a portion of data that is recently generated. For example, the data saved by buffer 140 at a current time may represent data corresponding to a window of time which occurs at most five minutes preceding the current time. In some examples, the data representative of the artificial reality environment which is saved to buffer 140 may correspond to a window of time that is within a range from thirty seconds to five minutes. In still other examples, the data representative of the artificial reality environment which is saved to buffer 140 may correspond to a window of time that is greater than five minutes.

In some cases, to update the data representative of the artificial reality environment, which is saved to buffer 140, the artificial reality application may replace the data with new data representative of the AR environment as time progresses. In at least some such cases, the data representative of the AR environment may represent a "moving window" of data which moves parallel to an advancement of the present time. In this way, as time advances from a first time to a second time, the moving window of data may change from a first time window which corresponds to a first portion of data to a second time window which corresponds to a second portion of data. The first time window may, in some cases, partially overlap with the second time window. To update the data saved by buffer 140, the artificial reality application may erase a part of the first portion of data corresponding to time preceding the second time window and add a part of the second portion of data corresponding to time occurring subsequent to the first time window. As such, buffer 140 may save the entire second portion of data in response to the artificial reality application updating the data saved by buffer 140. In some examples, artificial reality application updates the data saved by buffer 140 periodically (e.g., every second). In some examples, the artificial reality application updates the data saved by buffer 140 very frequently (e.g., every nanosecond or every millisecond) such that the moving window of data represents a "sliding window" of data. In other words, buffer 140 is configured to continuously save the data representative of the artificial reality environment generated during the time window immediately preceding a current point in time and continuously drop the data representative of the artificial reality environment generated prior to the time window.

In some examples, the artificial reality application is configured to capture the data representative of the artificial reality environment held by buffer 140. To capture the data, the artificial reality application may be configured to receive information indicative of a request to save the data representative of the artificial reality environment during the time window permanently in a memory. In turn, the artificial reality buffer may save the data held by buffer 140 at a current time permanently in the memory. Subsequently, in some examples, the artificial reality application is configured to replay, using HMD 112 or another device, the permanently saved data representative of the artificial reality environment during the time window.

During a replay of the permanently saved data representative of the artificial reality environment, a user of the respective replay device (e.g., HMD 112, another HMD, or another device such as one or more of remote devices 142) may receive the same or a similar experience as user 110 receives during the period of time in which the data representative of the AR environment from the perspective of HMD 112 is saved to buffer 140. For example, if a virtual object of virtual content item 124 performs an action during the period of time in which the data representative of the AR environment from the perspective of HMD 112 is saved to buffer 140, the action of the virtual object may be viewed by a user of the replay device during a replay of the data. Additionally, or alternatively, in response to another user of artificial reality system 10 entering the artificial reality environment of user 110 during the period of time in which the data representative of the artificial reality environment from the perspective of HMD 112 is saved to buffer 140, the artificial reality application may record one or more actions performs and one or more sounds (e.g., spoken words, exclamations, other sounds, or any combination thereof) emitted by the other user as a part of the data representative of the artificial reality environment from the perspective of HMD 112. The replay device may be configured to navigate the data representative of the artificial reality environment in order to focus on one or more aspects of the data.

In some examples, the artificial reality environment represents a virtual reality (VR) gaming experience provided to user 110 by HMD 112. Buffer 140 may store data representative of the VR gaming experience during a window of time on a rolling basis. For example, the data held by buffer 140 that is representative of the VR gaming experience may, when replayed using HMD 112 or another device, provide a same or similar experience as user 110 receives during the window of time while immersed in the VR gaming experience. The artificial reality application may receive user input indicative of a request to capture the data held by buffer 140. In turn, the artificial reality application may output a request to capture the data. In some examples, the artificial reality application may receive user input indicative of a request to export the data to one or more of remote device(s) 142 in order to share the data representative of the VR gaming experience with one or more users of remote device(s) 142.

In some examples, the artificial reality application may upload the permanently saved data to one or more remote devices of remote device(s) 142 configured to host a social media account associated with user 110C in order to share the data with one or more other social media accounts connected to the social media account associated with user 110C. In this way, users associated with the one or more other social media accounts may view the data representative of the artificial reality content during the window of time preceding the point in time in which the artificial reality application receives the user input to capture the data held by buffer 140. Additionally, or alternatively, artificial reality application may upload the permanently saved data to one or more remote devices of remote device(s) 142 accessible to one or more other users, where the one or more remote devices of remote device(s) 142 are not affiliated with a social media network.

In some examples, the artificial reality application may use a capture engine 141 to capture the data held by buffer 140. For example, to capture the data using capture engine 141, the artificial reality application may be configured to receive information indicative of a request to export the data representative of the artificial reality environment during the time window to a content moderator system in order to report one or more rules infractions by at least one of the one or more users participating in the artificial reality environment. Subsequently, the application engine may output an instruction for capture engine 141 to capture the data and export the data to the content moderator system. In some examples, the content moderator system may include at least one remote device of remote device(s) 142. In turn, the content moderator system may output information indicative of whether any rules infractions occurred based on the data.

As described above, multiple devices of artificial reality system 10 may work in conjunction in the AR environment, where each device may be a separate physical electronic device and/or separate integrated circuits (e.g., System on a Chip (SoC) integrated circuits) within one or more physical devices. In this example, peripheral device 136 is operationally paired with HMD 112 to jointly operate within artificial reality system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the artificial reality system 10 detects the user interface and performs an action that is rendered to HMD 112.

In some example implementations, as described herein, peripheral device 136 and HMD 112 may each include one or more SoC integrated circuits configured to support an artificial reality application, such as SoCs operating as co-application processors, sensor aggregators, display controllers, etc.

In some examples, the artificial reality application receives the information indicative of the request to permanently save, export, and/or replay the data representative of the artificial reality environment held by buffer 140 by identifying one or more gestures performed by user 110. For example, the artificial reality application may identify, based on image data collected by image capture devices 138 and/or image capture devices 139, a user interface (UI) activation gesture by user 110. The UI activation gesture may indicate a request for an options menu to be displayed by HMD 112 as a part of virtual reality content 122. In some examples, the UI activation gesture may include any one or a combination of a wrist movement of user 110, a hand movement of user 110, a finger movement of user 110, or another movement by user 110.

In some examples, the UI activation gesture may represent a user-programmed gesture such that the artificial reality application sets the UI activation gesture as corresponding to the options menu based on receiving information indicative of a user selection or a user input of the UI activation gesture as corresponding to a request to display the options menu. The artificial reality application may, for example, output a message using HMD 112 which instructs user 110 to perform a gesture indicative of a request to display the options menu. Subsequently, the artificial reality application may identify, based on image data captured by one or both of image capture devices 138, 139, the user selection of the gesture to represent the request to display the options menu. The artificial reality application may associate the gesture with the request to display the options menu so that the artificial reality application may display the options menu in response to detecting the UI activation gesture. In other examples, the UI activation gesture may represent a pre-programmed gesture such that the UI activation gesture is associated with the request to display the options menu during a manufacture of HMD 112.

In response to detecting the UI activation gesture based on image data captured by one or both of image capture devices 138, 139, the artificial reality application may render artificial reality content 122 to include the options menu. In some examples, the artificial reality application displays the options menu as a part of virtual user interface 137 or in another location of artificial reality content 122. The options menu may include, for example, a set of options selectable by user 110. The set of options may include any one or combination of words, characters, icons, and symbols. Additionally, the set of options may include one or more subsets of options, that are expandable and collapsible within the menu of options. For example, the artificial reality application may hide or show a subset of options of the set of options based on receiving information indicative of a request to hide or show the subset of options.

The artificial reality application may identify a user selection gesture by user 110 based on image data captured by one or both of image capture devices 138, 139. In some examples, by identifying the user selection gesture, the artificial reality application receives information indicative a user selection of an option of the set of options in the options menu. The user selection gesture may, for example, include a pointing gesture, a tapping gesture, or another gesture which identifies an option of the set of options. In some examples, the user selection of the option represents a request to permanently save the data representative of the artificial reality environment from the perspective of HMD 112 which is held by buffer 140, export the data held by buffer 140 to remote device(s) 142, replay the permanently saved data, or any combination thereof. Based on receiving the information indicative the user selection of the option, the artificial reality application may save, export, and/or replay the data accordingly.

Figure 1B:
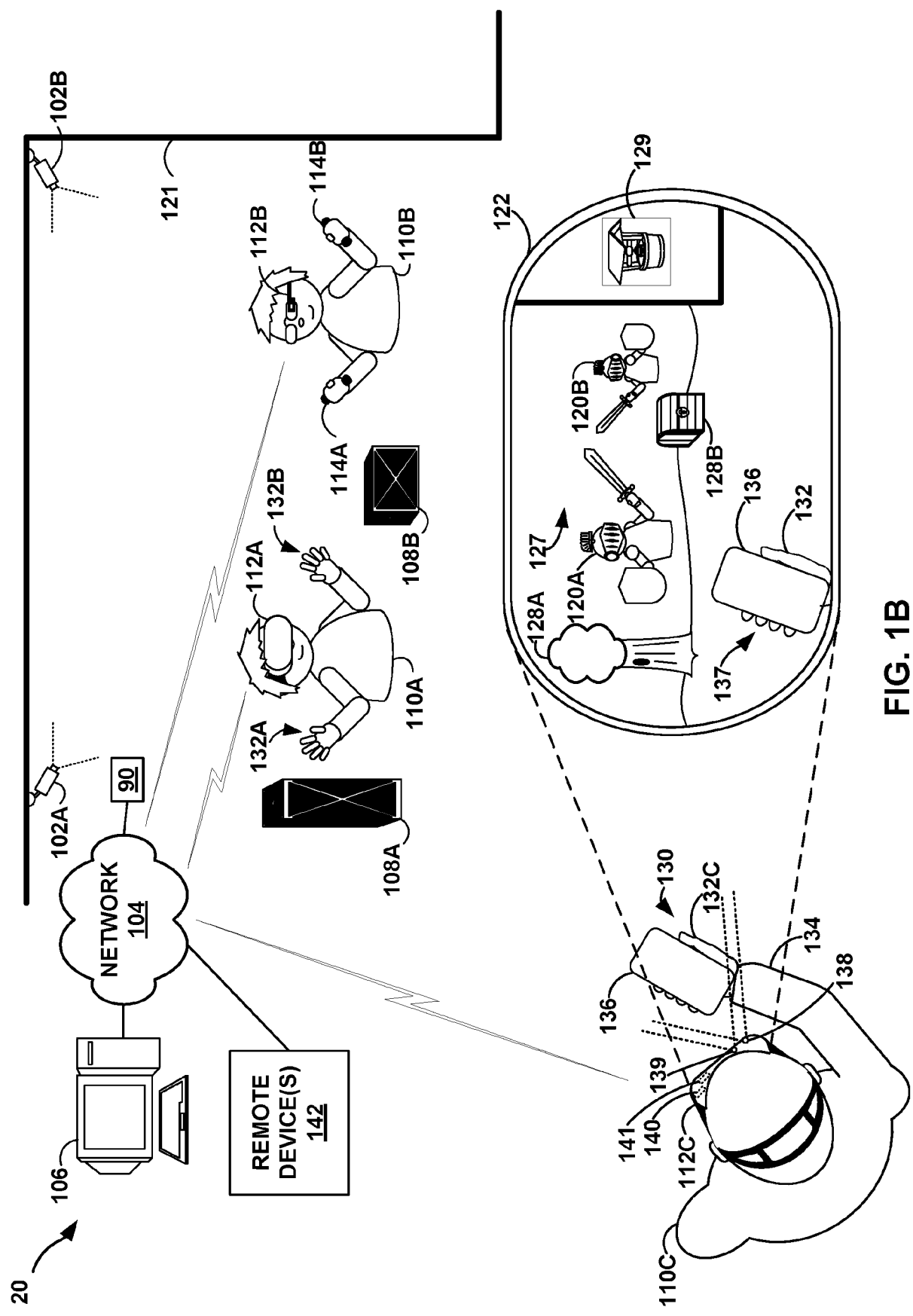
FIG. 1B is a conceptual diagram illustrating an artificial reality system for presenting a virtual environment to more than one user, in accordance with one or more techniques of this disclosure.

FIG. 1B is a conceptual diagram illustrating an artificial reality system 20 for presenting a virtual environment to more than one user, in accordance with one or more techniques of this disclosure. Similar to artificial reality system 10 of FIG. 1A, in some examples, artificial reality system 20 of FIG. 1B may generate and render virtual content items within a multi-user artificial reality environment. Artificial reality system 20 may also, in various examples, generate and render certain virtual content items and/or graphical user interface elements to a user in response to detection of one or more particular interactions with peripheral device 136 by the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial reality content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively. HMD 112C may be an example of HMD 112 of FIG. 1.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In some examples, console 106 and/or HMD 112C of artificial reality system 20 may generate and render a virtual surface including virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via image capture device 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some examples, the artificial reality application can run on console 106, and can utilize external cameras 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

In some examples, the artificial reality application may receive, from HMD 112C, information indicative of a request to permanently save, export, and/or replay data indicative of the multi-user artificial reality environment held in buffer 140. In turn, the artificial reality application may save, export, and/or replay data the data held by buffer 140 accordingly. Artificial reality system 20 may allow each of users 110A-110C to participate in the same multi-user virtual environment. For example, HMD 112C may display artificial reality content 122 which includes avatar 120A and avatar 120B corresponding to user 110A and user 110B, respectively. Based on image data captured by any one or both of image capture devices 138, 139, or image capture devices 102, the artificial reality application may generate artificial reality content 122 for display be HMD 122C based on one or more actions by user 110A and user 110B. For example, if user 110A moves an arm, the artificial reality application may generate artificial reality content 122 to show avatar 120A moving an arm.

In some examples, HMD 110C may output one or more audio signals relating to the virtual environment in addition to displaying virtual reality content 122. For example, the one or more audio signal may include words spoken by one or both of user 110A and user 110B. In some examples, the virtual environment may include one or more rules pertaining to conduct within the multi-user virtual environment provided by artificial reality system 20. In some examples, the artificial reality application may receive the information indicative of the request to export the held by the buffer 140 of HMD 112C as a request to investigate the portion of the artificial reality content for rules infractions. In turn, the artificial reality application may export the data held by the buffer 140 of HMD 112C to a moderator system which includes at least one of remote device(s) 142. The moderator system may generate a message representing a determination of whether any rules infractions occurred based on the data representative of the multi-user artificial reality environment exported by HMD 112C, for example.

External cameras 102, inside-out image capture devices 138, and pass-through image capture devices 139 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications.

Figure 2A:
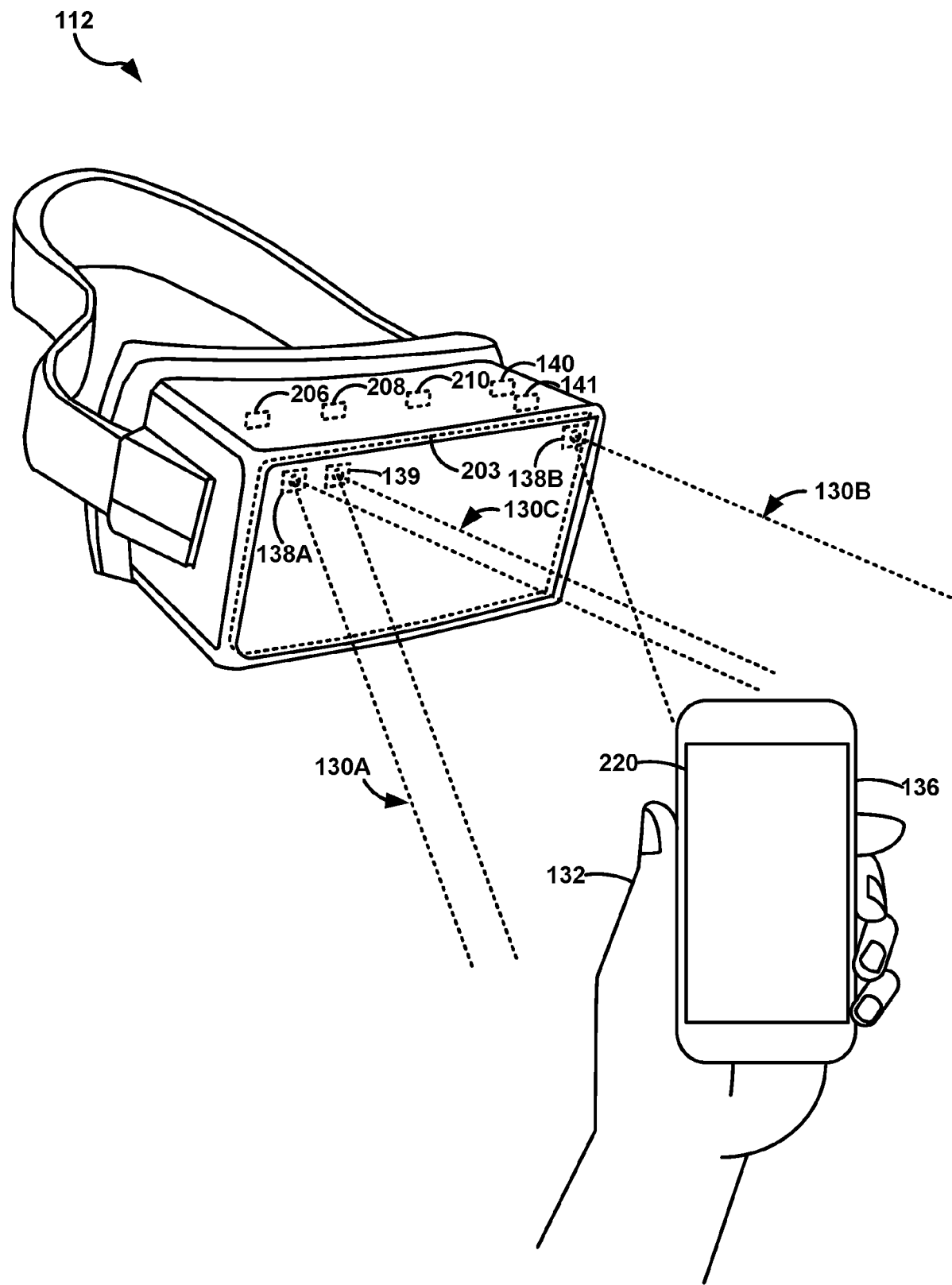
FIG. 2A is a conceptual diagram illustrating an example head-mounted display (HMD) and an example peripheral device for presenting a virtual scene to a user, in accordance with one or more techniques of this disclosure.

FIG. 2A is a conceptual diagram illustrating an example HMD 112 and an example peripheral device 136 for presenting a virtual scene to a user, in accordance with one or more techniques of this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may collect depth data indicative of a depth of one or more points and/or objects in the real-world, 3D physical environment of the user of HMD 112. In some examples depth sensors 208 may collect the depth data. In some examples inside-out image capture devices 138 may collect the depth data.

HMD 112 may include integrated inside-out image capture devices 138A and 138B (collectively, "inside-out image capture devices 138"), such as video cameras, laser scanners, Doppler radar scanners, depth scanners, or the like, configured to capture image data representative of the physical environment. More specifically, inside-out image capture devices 138 capture image data representative of objects (including peripheral device 136 and/or hand 132) in the physical environment that are within a field of view 130A, 130B of inside-out image capture devices 138, which typically corresponds with the viewing perspective of HMD 112. In some examples, two or more of inside-out image capture devices 138 may collect the depth data indicative of a depth of one or more points and/or objects in the real-world, 3D physical environment of the user of HMD 112. In this way, inside-out image capture devices 138 may represent depth sensors 208. In other cases, inside-out image capture devices 138 and depth sensors 208 may be separate devices.

HMD 112 may include one or more pass-through image capture devices 139. Pass-through image capture devices 139 may be configured to capture real-world image data in color and at a higher resolution than inside-out image capture devices 138, allowing artificial reality system to display, or "pass," at least some of the real-world image data to a user via HMD 112. In other words, HMD 112 may display a virtual scene to the user which includes one or more elements, objects, and aspects of a real-world scene that the user would see without using HMD 112.

HMD 112 includes an internal control unit 210, which may include an internal power source and one or more printed-circuit boards having one or more processors, memory, and hardware to provide an operating environment for executing programmable operations to process sensed data and present artificial reality content on display 203. One or more techniques described herein as being performed by control unit 210 may, in some examples, be performed by any one or combination of console 106, peripheral device 136, and HMD 112.

In one example, control unit 210 is configured to, based on the sensed data (e.g., image data captured by any one or more of image capture devices 102, inside-out image capture devices 138, and pass-through image capture devices 139, and position information from GPS sensors), generate and render for display on display 203 one or more virtual content items (e.g., virtual content items 124, 126 of FIG. 1A) associated with a position contained within field of view 130A, 130B of inside-out image capture devices 138 or within field of view 130C of image capture device 139, where the one or more virtual content items are part of the artificial reality content. As explained with reference to FIGS. 1A-1B, a virtual content item may be associated with a position within a real-world environment, and control unit 210 can be configured to render the virtual content item (or portion thereof) for display on display 203 in response to a determination that the position associated with the virtual content (or portion therefore) is within the current field of view 130A, 130B.

In some examples, control unit 210 is configured to cause buffer 140 to hold data representative of the artificial reality environment from a perspective of HMD 112 during a time window on a rolling basis. The data representative of the artificial reality environment that is held by buffer 140 may represent full state data including a 360-degree view of the artificial reality environment from a position of HMD 112, including data representative of one or more objects and/or users that are within the field of view 130 of HMD 112 (e.g., artificial reality content 122) and data representative of one or more objects and/or users that are outside of the field of view 130 of HMD 112. Additionally, the data held by buffer 140 may include video data, audio data, and other types of data such as data for causing one or more devices to perform mechanical movements (e.g., mechanical vibrations).

In some examples buffer 140 represents a rolling buffer since the data saved to buffer 140 updates as time moves forward. For example, control unit 210 may cause buffer 140 to continuously save the data representative of the artificial reality environment generated during the time window immediately preceding a current point in time. Additionally, control unit 210 may cause buffer 140 to continuously drop the data representative of the artificial reality environment generated prior to the time window. In some examples, a length of the time window may be within a range from 30 seconds to 5 minutes (e.g., 2 minutes).

In some examples, an artificial reality application executed by control unit 210 is configured to, based on image data captured by one or both of image capture devices 138, 139, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by inside-out image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize inside-out image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and enable the user to interface with that UI menu based on detection of a user interface gesture, selection gesture, stamping gesture, translation gesture, rotation gesture, and drawing gesture performed by the user with respect to the peripheral device, as described in further detail below.

For example, based on image data captured by one or both of image capture devices 138, 139, the artificial reality application executed by control unit 210 may identify a UI activation gesture by a user (e.g., user 110 of FIG. 1A). The UI activation gesture may represent a request for an options menu to be displayed by HMD 112. Subsequently, control unit 210 may generate the options menu as an overlay to the virtual reality content generated for display by the electronic display 203 of HMD 112. The options menu may include a set of options which may be selected by the user. In some examples, the options menu may be an example of a UI menu rendered by control unit 210. The artificial reality application executed by control unit 210 may identify a user selection gesture by the user of HMD 112, the user selection gesture indicating a user selection of an option of the set of options. The user-selected option may represent a request to permanently save, export, and/or replay the data held by buffer 140.

In some examples, the UI activation gesture may represent a gesture that is pre-programmed during a manufacture of HMD 112. In some examples, the UI activation gesture may represent a user-programmable gesture. For example, HMD 112 may render a message on electronic display requesting that the user of HMD 112 perform a gesture which represents a request to display the options menu. Subsequently, control unit 210 may identify, in image data captured by one or both of image capture devices 138, 139, the gesture performed by the user of HMD 112 to represent the request to display the options menu. In turn, control unit 210 may program the user-performed gesture as the UI activation gesture representing the request to display the options menu. Additionally, in some examples, control unit 210 may program a UI deactivation gesture which represents a request to remove the options menu or another UI menu from display by the electronic display 203 of HMD 112. The UI deactivation gesture, in some examples, may be user-programmed. Additionally, or alternatively, the UI deactivation gesture may represent a tapping or other selection of a virtual close-out button rendered as a part of the options menu, such as a close-out button (e.g., an "x") in a corner of the options menu.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on surface 220 and detect user input (e.g., touch or hover input) on surface 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

Figure 2B:
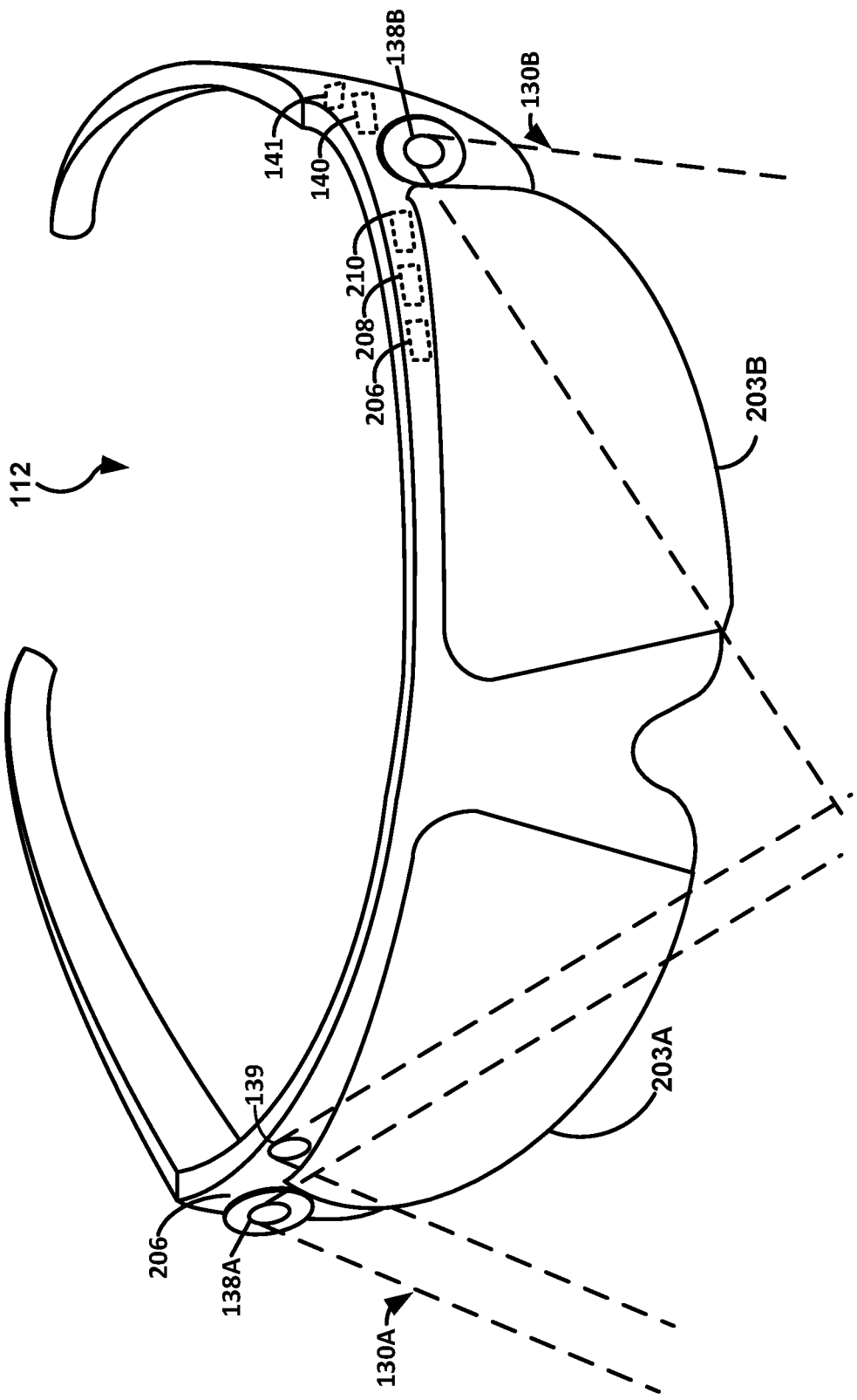
FIG. 2B is a conceptual diagram illustrating another example HMD, in accordance with one or more techniques of this disclosure.

FIG. 2B is a conceptual diagram illustrating another example HMD 112, in accordance with one or more techniques of this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses including a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting dioeagleberk2192de (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may include one or more depth sensors 208 which collect depth data indicative of a depth of one or more points and/or objects in the real-world, 3D physical environment of the user of HMD 112. Moreover, HMD 112 may include integrated inside-out image capture devices 138A and 138B (collectively, "inside-out image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, an artificial reality application executed by control unit 210 may cause buffer 140 to hold data representative of an artificial reality environment during a time window on a rolling basis. For example, the time window may represent a rolling window or sliding window of data which updates as time moves forward. In some cases, the artificial reality application executed by control unit 210 may permanently save, export, and/or replay the data held by buffer 140 in response to receiving information indicative of an instruction to save, export, and/or replay the data. In some examples, the artificial reality application executed by control unit 210 may detect a gesture in image data captured by one or both of image capture devices 138, 139, where the gesture represents a user selection of an option to save, export, and/or replay the data held by buffer 140. In some examples, the HMD of FIG. 2B may perform any of the techniques discussed with respect to the HMDs of FIGS. 1A, 1B, and 2A.

Figure 3:
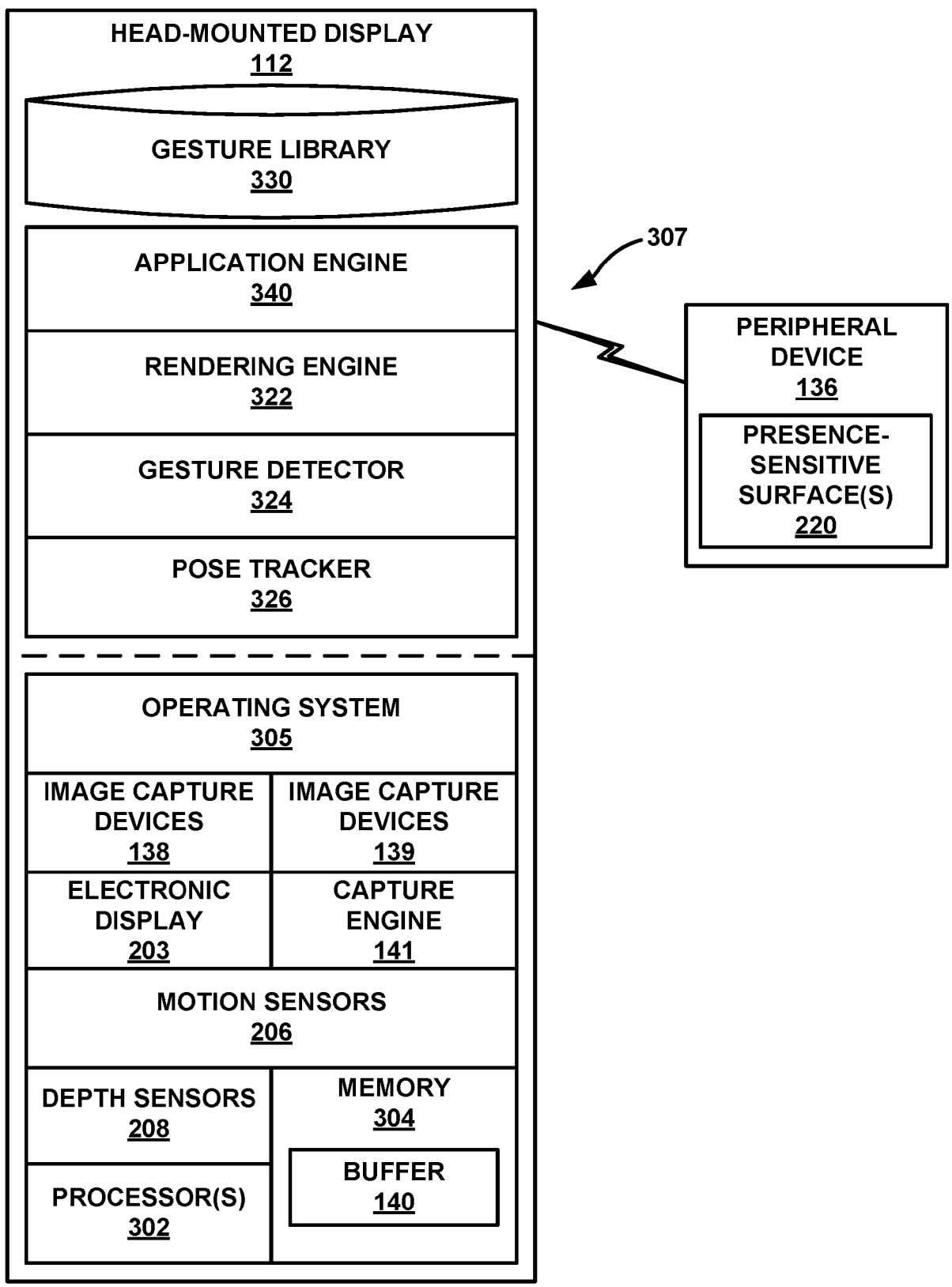
FIG. 3 is a block diagram in which a virtual environment is generated by the HMD of the artificial reality systems of FIGS. 1A, 1B, in accordance with one or more techniques of this disclosure.

FIG. 3 is a block diagram in which a virtual environment is generated by HMD 112 of the artificial reality systems of FIGS. 1A, 1B, in accordance with one or more techniques of this disclosure. In the example of FIG. 3, HMD 112 generates artificial reality content for display using electronic display 203, where the artificial reality content is part of an artificial reality experience in which user 110 participates. Buffer 140 may hold a portion of the artificial reality experience on a rolling basis, such that the data held by buffer 140 updates as time progresses. Capture engine 141 may capture the data held by buffer 140 in response to receiving a user input. Additionally, or alternatively, gesture detector 324 of HMD 112 may detect one or more gestures and cause HMD 112 to display one or more virtual user interfaces based on one or more gestures detected using image data collected by one or both of image capture devices 138, 139.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including rendering engine 322, gesture detector 324, pose tracker 326, and application engine 340. In some examples, software applications 307 of console HMD 112 operate to provide an overall artificial reality application. Gesture detector 324 may be configured to communicate with gesture library 330 which may, in some cases, be stored in memory 304. As discussed with respect to the examples of FIGS. 2A and 2B, processors 302 are coupled to electronic display 203, motion sensors 206, depth sensors 208 inside-out image capture devices 138, and pass-through image capture devices 139. In some examples, processors 302 and memory 304 may be separate, discrete components. In other examples, memory 304 may be on-chip memory collocated with processors 302 within a single integrated circuit.

HMD 112 may represent a computing device that processes image and tracking information received from any one or more of cameras 102 (FIG. 1B), inside-out image capture devices 138, and pass-through image capture devices 139, in order to perform any one or combination of generate artificial reality content for display by electronic display 203, where the artificial reality content is a part of an artificial reality experience in which user 110 participates. In some examples, at least a portion of HMD 112, such as processors 302 and/or memory 304, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In general, application engine 340 includes functionality to provide and present an artificial reality application, e.g., a teleconference application, a gaming application, a navigation application, an educational application, training or simulation applications, and the like. Application engine 340 may include, for example, one or more software packages, software libraries, hardware drivers, and/or Application Program Interfaces (APIs) for implementing an artificial reality application on HMD 112. Responsive to control by application engine 340, rendering engine 322 may generate 3D artificial reality content for display to the user by application engine 340 of HMD 112.

In some examples, application engine 340 and rendering engine 322 may construct artificial reality content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data collected by HMD 112, such as movement information and user commands, and, in some examples, data from any external sensors (e.g., sensors 90 of FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for display by electronic display 203.

Pose tracker 326 may determine a current pose for peripheral device 136 and, in accordance with the current pose, trigger certain functionality associated with any rendered virtual content (e.g., places a virtual content item, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

Rendering engine 322 is configured to render, based on a current pose for peripheral device 136, the virtual content in the artificial reality environment that may be locked relative to a position of another object in the artificial reality environment. Rendering engine 322 may scale, rotate, and otherwise transform the virtual content to match the position of the object such that the virtual content appears, in the artificial reality environment, to be overlaid on or near the object. In some examples, rendering engine 322 may receive pose information from peripheral device 136 in order to continually update the user interface position and pose to match that of the peripheral device 136, such as that of one of presence-sensitive surfaces 220.

In some examples, buffer 140 is configured to hold data representative of the artificial reality environment in which user 110 is participating. In some examples, the data representative of the artificial reality environment corresponds to a time window and the data held by buffer 140 updates on a rolling basis. In some examples, the data held by buffer 140 may be held using any one or combination of memory 304. In some examples, the time window may correspond to a recent period of time. For example, the time window may occur more recently than five minutes preceding a current time. In some examples, a length of the time window may be within a range from 30 seconds to 5 minutes. For example, the length of the time window may be 2 minutes.

The data held by buffer 140 may update as time progresses. For example, buffer 140 may continuously save the data representative of the artificial reality environment generated during the time window immediately preceding a current point in time. Additionally, buffer 140 may continuously drop the data representative of the artificial reality environment generated prior to the time window.

Based on the sensed data from any one or a combination of image capture devices 138, 139, and 102, presence-sensitive surfaces 220, and other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console HMD 112 to cause HMD 112 to responsively perform one or more actions.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed.

Each of the entries in gesture library 330 further may specify, for each of the defined gestures or combinations/series of gestures, a desired response or action to be performed by software applications 307. For example, certain specialized gestures may be pre-defined such that, in response to detecting one of the pre-defined gestures, rendering engine 322 dynamically generates a user interface as an overlay to artificial reality content being displayed to the user, thereby allowing the user 110 to easily invoke a user interface for configuring HMD 112 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The rendering engine 322 can define the menu that is displayed and can control actions that are performed in response to selections caused by selection gestures.

In some examples, gesture library 330 may include a UI activation gesture and a user selection gesture. The UI activation gesture may represent a user request to display an options menu (e.g., a UI menu) using electronic display 203. Rendering engine 322 may receive, based on gesture detector 324 detecting a UI activation gesture performed by the user in image data captured by image capture devices 138, 139, and/or 102, information indicative of a request to display the options. In order to detect the UI activation gesture, gesture detector 324 may cross-reference the video data with gesture library 330 to determine whether the UI activation gesture is present in the video data. In response to receiving the information indicating that gesture detector 324 detects the UI activation gesture, rendering engine 322 may generate artificial reality content including the options menu for display by electronic display 203 of HMD 112.

Rendering engine 322 may receive information indicative of a user selection of an option from a set of options of the options menu displayed by HMD 112. In some examples, gesture detector 324 may detect, in the video data captured by any one or combination of image capture devices 138, 139, and 102 a user selection gesture representing the user selection of the options. Additionally, or alternatively, capture engine 141 may receive a signal generated by presence-sensitive surfaces 220 which includes the information indicative of the user selection of the option. For example, rendering engine 322 may generate the virtual options menu as an overlay to a surface of peripheral device 136, and the user may interact with the virtual options menu by providing physical inputs to presence-sensitive surfaces 220 of peripheral devices 136. In some examples, the information indicative of the user selection from the options menu represents a request to permanently save, export, and/or replay data held by buffer 140.

In some examples, processors 302 may include any one or more of a multi-core processor, a controller, a digital signal processor (DSP), an application specific integrated circuit (ASIC), a field-programmable gate array (FPGA), or equivalent discrete or integrated logic circuitry. Memory 304 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Figure 4:
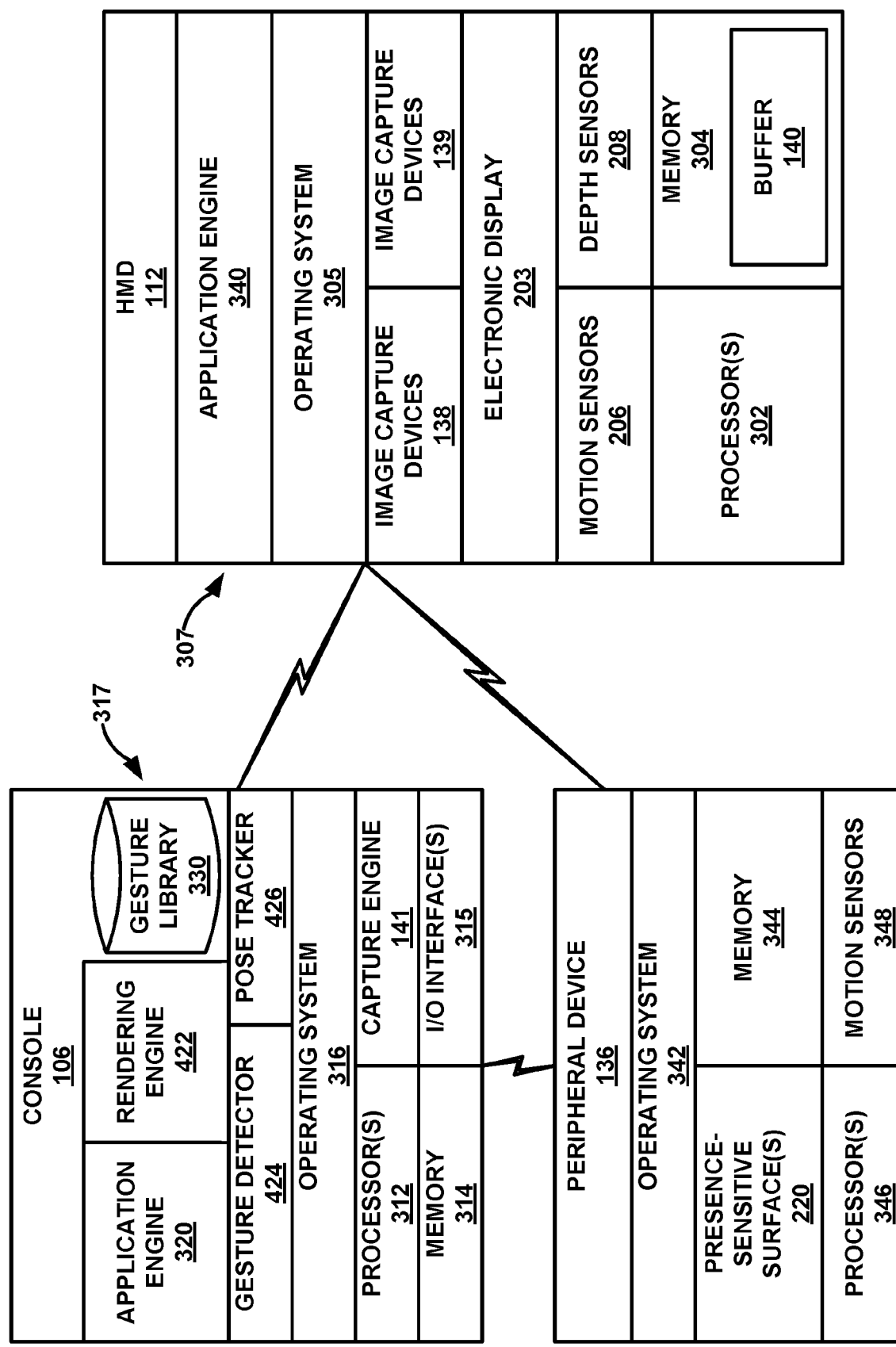
FIG. 4 is a block diagram illustrating example implementations of the console, the HMD, and the peripheral device of the multi-device artificial reality systems of FIGS. 1A, 1B, in accordance with one or more techniques of this disclosure.

FIG. 4 is a block diagram illustrating example implementations of console 106, HMD 112, and peripheral device 136 of multi-device artificial reality system 10, 20 of FIGS. 1A, 1B, in accordance with one or more techniques of this disclosure. In the example of FIG. 4, console 106 generates artificial reality content for display by HMD 112, where the artificial reality content is part of an artificial reality experience in which user 110 participates. Buffer 140 may hold a portion of the artificial reality experience on a rolling basis, such that the data held by buffer 140 updates as time progresses. Data held by Buffer 140 may be held in any one or a combination of memory 301, memory 314, and memory 344. Additionally, or alternatively, console 106 may detect one or more gestures and cause HMD 112 to display one or more virtual user interfaces based on one or more gestures detected using image data collected by one or both of image capture devices 138, 139.

In general, console 106 is a computing device that processes image and tracking information received from any one or more of cameras 102 (FIG. 1B), inside-out image capture devices 138, and pass-through image capture devices 139. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software applications 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104 of FIGS. 1A-1B.

Software applications 317 of console 106 operate to provide an overall artificial reality application. In this example, software applications 317 include application engine 320, rendering engine 422, gesture detector 424, and pose tracker 426. Gesture detector 424 may be configured to communicate with gesture library 330 which may, in some cases, be stored in memory 314. In various examples, software applications 317 operate similar to the counterpart components of HMD 112 of FIG. 3 (e.g., application engine 340, rendering engine 322, gesture detector 324, and pose tracker 326, respectively) to generate artificial reality content for display be electronic display 203, hold data representative of an artificial reality environment during a time window on a rolling basis in a buffer 140, save the data representative of an artificial reality environment during the time window permanently in a memory (e.g., memory 304), export the data held by buffer 140, replay the data held by buffer 140, or any combination thereof. In the example of FIG. 4, console 106 may include capture engine 141.

In the example shown in FIG. 4, peripheral device 136 includes one or more processors 346 and memory 344 that, in some examples, provide a computer platform for executing an operating system 342, which may be an embedded, real-time multitasking operating system, for instance, or other type of operating system. In turn, operating system 342 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can include a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen).

As further shown in FIG. 4, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input /output device for the HMD in the virtual environment. In some examples, the peripheral device 136 may operate as an artificial reality co-processing device to which some of the functions of the HMD are off-loaded. In one or more aspects, peripheral device 136 can be a smartphone, tablet, or other hand-held device.

In some examples, each of processors 302, 312, 346 may include any one or more of a multi-core processor, a controller, a DSP, an ASIC, an FPGA, or equivalent discrete or integrated logic circuitry. Memory 304, 314, 344 may include any form of memory for storing data and executable software instructions, such as RAM, ROM, PROM, EPROM, EEPROM, and flash memory.

Figure 5:
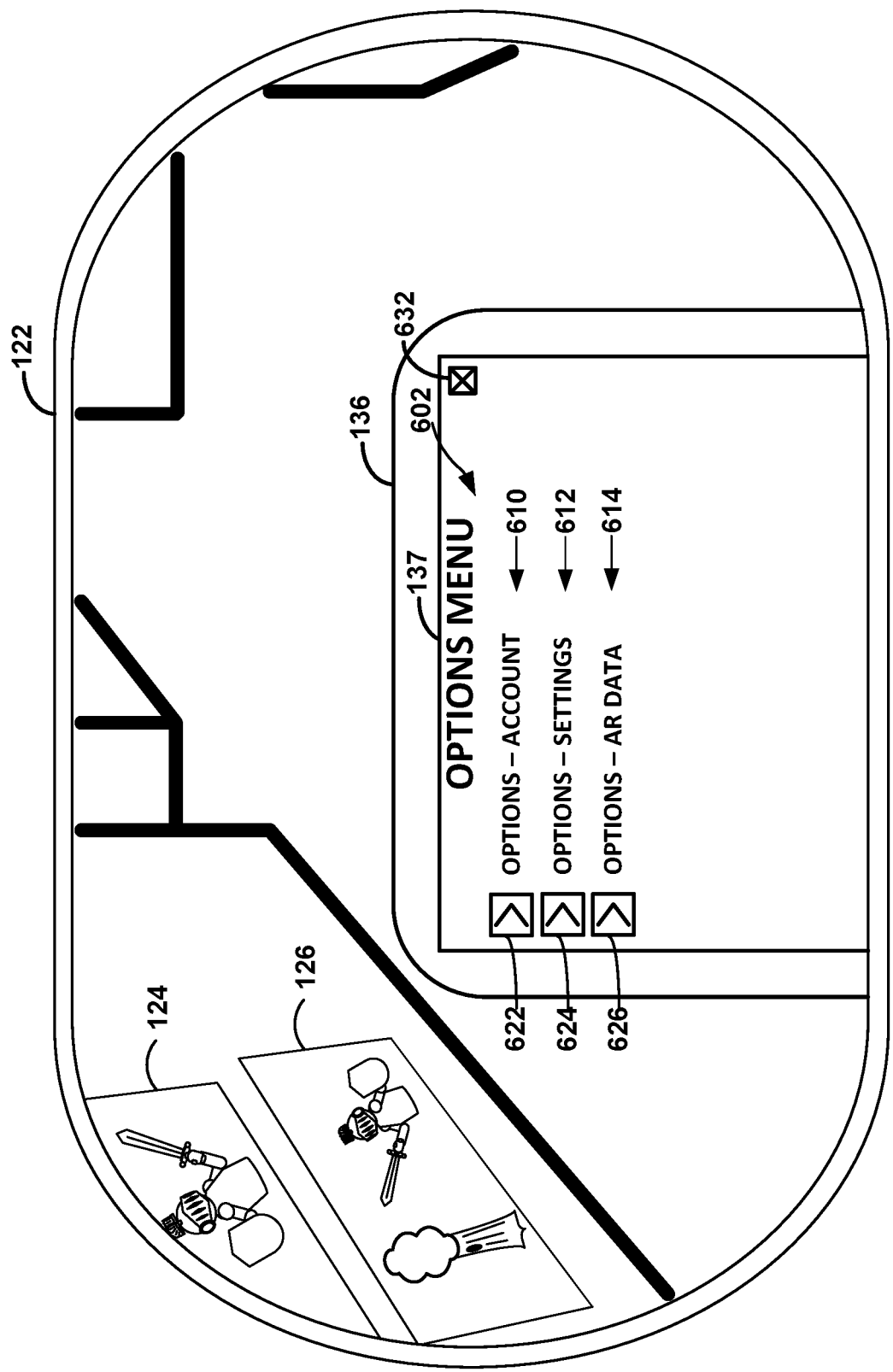
FIG. 5 is a conceptual diagram illustrating example artificial reality content including an options menu, in accordance with one or more techniques of this disclosure.

FIG. 5 is a conceptual diagram illustrating example artificial reality content 122 including an options menu 602, in accordance with one or more techniques of this disclosure. As seen in FIG. 5, Options menu 602 may be a part of virtual user interface 137 which is generated as an overlay to a surface of peripheral device 136. Options menu 602 may include account options 610, settings options 612, and artificial reality (AR) data options 614, as an example. Account options 610 may include a set of account options which are hidden from view on options menu 602. Control button 622 controls whether the set of account options is hidden or displayed on options menu 602. Settings options 612 may include a set of settings options which are hidden from view on options menu 602. Control button 624 controls whether the set of settings options is hidden or displayed on options menu 602. Artificial reality data options 614 may include a set of artificial reality data options which are hidden from view on options menu 602. Control button 626 controls whether the set of artificial reality data options is hidden or displayed on options menu 602. Additionally, options menu 602 includes a close-out button 632 which if selected by a user may cause options menu 602 to disappear from virtual user interface 137.

Figure 6:
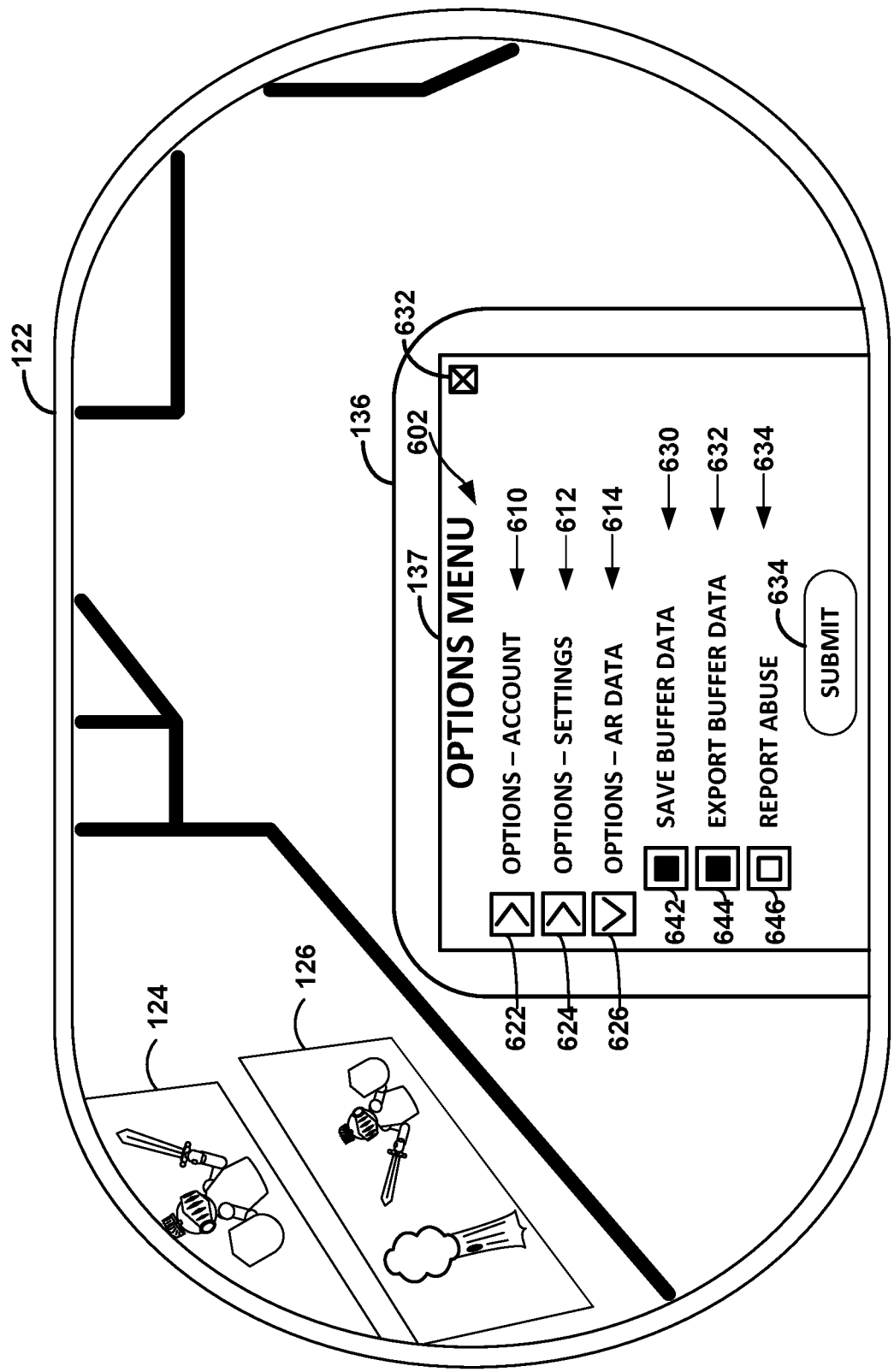
FIG. 6 is a conceptual diagram illustrating example artificial reality content including an options menu where artificial reality options are displayed, in accordance with one or more techniques of this disclosure.

FIG. 6 is a conceptual diagram illustrating example artificial reality content 122 including an options menu 602 where artificial reality options 614 are displayed, in accordance with one or more techniques of this disclosure. The virtual user interface of FIG. 6 may be substantially the same as the virtual user interface of FIG. 5, except that the set of artificial reality options 614 including "save buffer data" 630, "export buffer data" 632, and "report abuse" 634 are displayed on the virtual user interface of FIG. 6 whereas the set of artificial reality options 614 are hidden in the virtual user interface of FIG. 5. For example, the downwards facing arrow of control button 626 in the virtual user interface of FIG. 6 indicates that the set of artificial reality options 614 are shown and the rightwards facing arrow of control buttons 622 and 624 in the virtual user interface of FIG. 6 indicates that the set of account options 622 and the set of settings options 624, respectively, are hidden. Additionally, control button 642 indicates that the "save buffer data" 630 option is selected, control button 644 indicates that the "export buffer data" 632 option is selected, and control button 646 indicates that the "report abuse" 634 option is not selected. As such, if "submit" button 634 is selected, an artificial reality application may permanently save data held in a buffer and export the data that is permanently saved, without reporting one or more rules violations or abuses.

Figure 7:
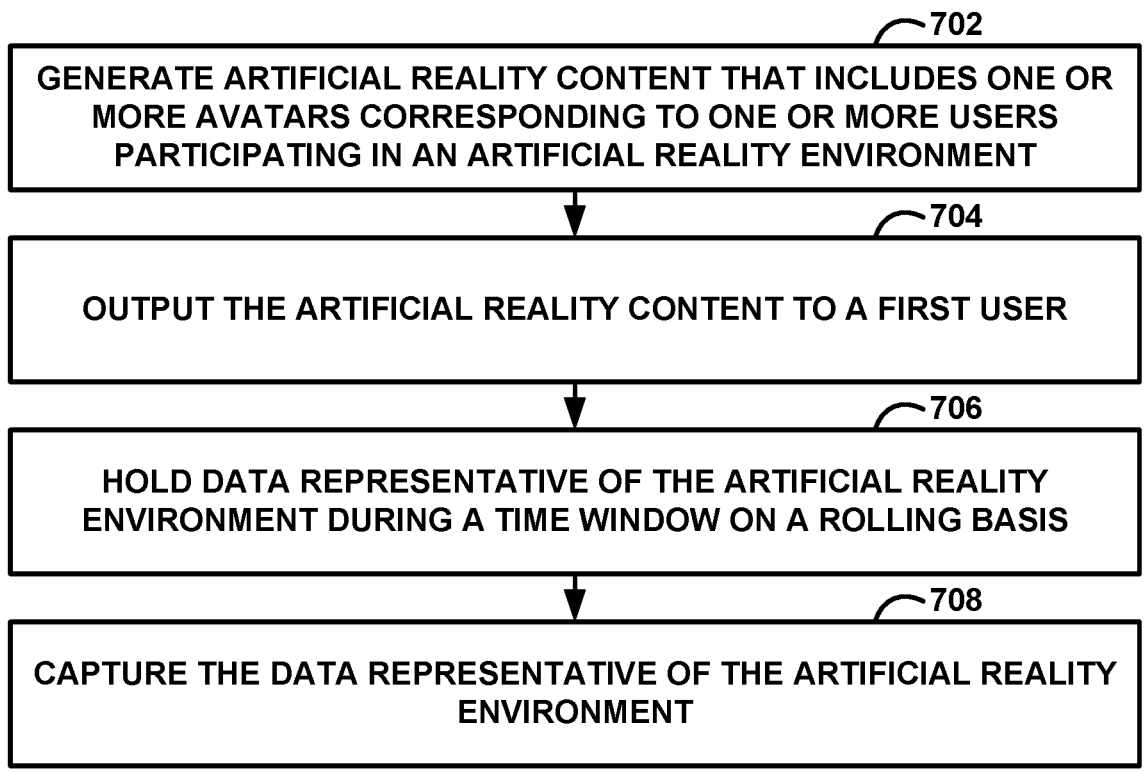
FIG. 7 is a flow diagram illustrating an example operation for capturing data representative of an artificial reality environment in a rolling buffer, in accordance with one or more techniques of this disclosure.

FIG. 7 is a flow diagram illustrating an example operation for capturing data representative of an artificial reality environment in a rolling buffer, in accordance with one or more techniques of this disclosure. FIG. 7 is described with respect to console 106, HMD 112, and peripheral device 136. However, the techniques of FIG. 7 may be performed by different components of console 106, HMD 112, and peripheral device 136, or by additional or alternative devices.

In some examples, one or more users may participate in an artificial reality environment, using a variety of devices. For example, an application engine (e.g., any one or combination of application engine 320, application engine 340, and application engine 340) may generate artificial reality content 122 based on a pose of user 110 participating in the artificial reality environment (702). For example, avatar 120A in the artificial reality content 122 of FIG. 1B corresponds to user 110A and avatar 120B in the artificial reality content 122 of FIG. 1B corresponds to user 110B. In some examples, to generate artificial reality content 122, HMD 112C may include one or more depth sensors which collect depth data indicative of a depth of one or more points and/or objects in the real-world, three-dimensional (3D) physical environment of user 110C. In some examples, the depth sensors may include a set of at least two inside-out image capture devices 138. The application engine may generate a 3D mesh based on the depth data. The application engine may receive, from image capture devices 139, image data indicative of real-world image data in color and at a higher resolution than inside-out image capture devices 138. The application engine may overlay at least a portion of the real-world image data on the 3D mesh to generate a three-dimensional (3D) scene of a physical environment of user 110C. Additionally, the application engine may generate virtual content to overlay on the 3D scene of the physical environment in order to generate virtual reality content 122.

HMD 112C outputs the artificial reality content to user 110C (704). In some examples, HMD 112C outputs the artificial reality content to user 110C via electronic display 203 such that user 110C may view the artificial reality environment from a perspective of the virtual reality content 122 displayed by electronic display 203. In some examples, the perspective of virtual reality content 122 may depend on a pose of HMD 112C, where the pose represents a viewing perspective of HMD 112C. For example, the application engine may generate virtual reality content 112C based on a field of view 130 of one or more image capture devices (e.g., image capture devices 138, 139) of HMD 112C. In the example of FIG. 1B, since users 110A and 110B are within the field of view of the one or more image capture devices of HMD 112C, avatars 120A and 120B appear within virtual reality content 122. However, other users not illustrated in FIG. 1B may be participants in the virtual reality environment, but not within the field of view 130 of HMD 112C. In some examples, objects and users outside of field of view 130 might not be rendered in the virtual reality content 122 displayed to user 110C using HMD 112C but may be included in data representative of the virtual reality environment in which user 110C is participating. If field of view 130 changes to a new field of view, in some cases, the application engine may generate new artificial reality content 122 to include avatars and representations of users and objects that are within the new field of view and part of the virtual reality environment, but are not within the former field of view. In this way, data representative of the artificial reality environment of user 110C may include "full state" data including a 360-degree view of the artificial reality environment from a position of user 110C.

Buffer 140 of HMD 112C may be configured to hold data representative of the artificial reality environment during a time window on a rolling basis (706). In some examples, to hold the data representative of the artificial reality environment, buffer 140 is configured to continuously save the data representative of the artificial reality environment generated during the time window immediately preceding a current point in time. Additionally, buffer 140 is configured to continuously drop the data representative of the artificial reality environment generated prior to the time window. In this way, the time window may represent a moving time window or a sliding time window that changes as time advances. In some examples, the time window occurs within five minutes prior to the present time. In some examples, a length of the time window is within a range from 30 seconds to 5 minutes (e.g., 2 minutes).

Capture engine 141 of HMD 112 may capture the data representative of the artificial reality environment held in buffer 140 (708) in response to user input at a point in time at which the user input is received. In some examples, the data representative of the artificial reality environment held in buffer 140 at the point in time includes at least the artificial reality content 122 generated for display by HMD 112C during the time window immediately preceding the point in time at which the user input was received. Additionally, the data may include data corresponding to objects and/or users that are not within a field of view 130 of HMD 112C at any point within the window of time and thus is not represented in artificial reality content 122. Since the data representative of the artificial reality environment may include full state data including a 360-degree view of the artificial reality environment from a position of user 110C, the data held by buffer 140 may be more comprehensive than the artificial reality content 122 delivered by HMD 112C during the time window.

In some examples, to capture the data using relay engine 141, the application engine is configured to receive information indicative of a request to save the data representative of the artificial reality environment during the time window permanently in a memory (e.g., memory 304, memory 314, and memory 344. In turn, the application engine may output a message to relay engine 141, instructing relay engine 141 to save the data held by buffer 140 at a current time permanently in the memory. Subsequently, in some examples, the application engine is configured to replay, using HMD 112C or another device, the permanently saved data representative of the artificial reality environment during the time window. Additionally, or alternatively, the application engine may upload the data to one or more remote devices of remote device(s) 142 configured to host a social media account associated with user 110C in order to share the data with one or more other social media accounts connected to the social media account associated with user 110C.

In some examples, to capture the data using relay engine 141, the application engine is configured to receive information indicative of a request to export the data representative of the artificial reality environment during the time window to a content moderator system in order to report one or more rules infractions by at least one of the one or more users participating in the artificial reality environment. Subsequently, the application engine may output an instruction for relay engine 141 to capture the data and export the data to the content moderator system. In some examples, the content moderator system may include at least one remote device of remote device(s) 142.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

What is claimed is:

1. An artificial reality system comprising:
   an application engine configured to generate artificial reality content based on a pose of a user participating in an artificial reality environment; and
   a head-mounted display (HMD) configured to output the artificial reality content to the user, the HMD comprising:
   a buffer configured to hold data representative of the artificial reality environment during a time window on a rolling basis, wherein the data representative of the artificial reality environment represents a view of the artificial reality environment from a position of the user, wherein the data representative of the artificial reality environment represents full state data that is more comprehensive than the artificial reality content output to the user, wherein the view of the artificial reality environment represents a 360 degree view of the artificial reality environment from the position of the user, wherein the view of the artificial reality environment includes data representative of one or more objects that are within a field of view of the HMD and data representative of one or more objects that are outside of the field of view of the HMD, and wherein to hold the data on the rolling basis, the buffer is configured to:

continuously save the full state data representative of the artificial reality environment representing the view of the artificial reality environment that is generated during the time window immediately preceding a current point in time, the view of the artificial reality environment including the data representative of the one or more objects that are within the field of view of the HMD and the data representative of the one or more objects that are outside of the field of view of the HMD; and continuously drop the full state data representative of the artificial reality environment representing the view of the artificial reality environment that is generated prior to the time window, the view of the artificial reality environment including the data representative of the one or more objects that are within the field of view of the HMD and the data representative of the one or more objects that are outside of the field of view of the HMD; and a capture engine configured to, in response to user input, capture the full state data representative of the artificial reality environment held in the buffer at a point in time at which the user input was received.

2. The artificial reality system of claim 1, wherein the full state data representative of the artificial reality environment held in the buffer at the point in time includes at least the view of the artificial reality environment including the data representative of the one or more objects that are within the field of view of the HMD and the data representative of the one or more objects that are outside of the field of view of the HMD immediately preceding the point in time at which the user input was received.

3. The artificial reality system of claim 1, wherein the application engine is further configured to:

receive information indicative of a request to save the full state data representative of the artificial reality environment during the time window permanently in a memory; and save, in response to receiving the information, the full state data representative of the artificial reality environment during the time window permanently in the memory.

4. The artificial reality system of claim 3, wherein the application engine is further configured to perform one or both of:

replay, using the HMD or another device, the permanently saved full state data representative of the artificial reality environment during the time window; or upload the permanently saved full state data representative of the artificial reality environment to one or more remote devices configured to host a social media account associated with the user in order to share the data with one or more other social media accounts connected to the social media account associated with the user.

5. The artificial reality system of claim 1, wherein the application engine is further configured to:

receive information indicative of a request to export, to one or more remote devices, the full state data representative of the artificial reality environment during the time window in order to share the data with one or more users of the one or more remote devices; and export, in response to receiving the information, the full state data representative of the artificial reality environment to the one or more remote devices.

6. The artificial reality system of claim 1, wherein the application engine is further configured to:

receive information indicative of a request to export the full state data representative of the artificial reality environment during the time window to a content moderator system in order to report one or more rules infractions by at least one other user participating in the artificial reality environment; and export, in response to receiving the information, the full state data representative of the artificial reality environment to the content moderator system.

7. The artificial reality system of claim 1, further comprising:

an image capture device configured to capture image data representative of a physical environment of the user;

a gesture detector configured to identify, from the image data, a user interface (UI) activation gesture performed by the user in a field of view of the image capture device; and a rendering engine configured to, in response to identifying the UI activation gesture, render an options menu as an overlay to the artificial reality content for display on the HMD, wherein the options menu comprises a set of options.

8. The artificial reality system of claim 7, wherein the gesture detector is further configured to:

identify, from the image data, a user selection gesture performed by the user in a field of view of the image capture device, wherein the user selection gesture indicates a user selected option of the set of options, and wherein based on the user selected option, the capture engine captures the full state data representative of the artificial reality environment from the buffer.

9. The artificial reality system of claim 8, wherein the application engine is further configured to perform one or more of:

store, based on the user selected option of the set of options, the full state data representative of the artificial reality environment permanently in a memory;

export, based on the user selected option of the set of options, the full state data representative of the artificial reality environment to one or more remote devices in order to share the full state data representative of the artificial reality environment with one or more users of the one or more remote devices; and export, based on the user selected option of the set of options, the full state data representative of the artificial reality environment to a content moderator system in order to report one or more rules infractions by at least one other user participating in the artificial reality environment.

10. A method comprising:

generating, using an application engine, artificial reality content based on a pose of a user participating in an artificial reality environment;

outputting, using a head-mounted display (HMD), the artificial reality content to the user;

holding, using a buffer of the HMD, data representative of the artificial reality environment during a time window on a rolling basis, wherein the data representative of the artificial reality environment represents a view of the artificial reality environment from a position of the user, wherein the data representative of the artificial reality environment represents full state data that is more comprehensive than the artificial reality content output to the user, wherein the view of the artificial reality environment represents a 360 degree view of the artificial reality environment from the position of the user, wherein the view of the artificial reality environment includes data representative of one or more objects that are within a field of view of the HMD and data representative of one or more objects that are outside of the field of view of the HMD, and wherein holding the data on the rolling basis comprises:
  continuously saving the full state data representative of the artificial reality environment representing the view of the artificial reality environment that is generated during the time window immediately preceding a current point in time, the view of the artificial reality environment including the data representative of the one or more objects that are within the field of view of the HMD and the data representative of the one or more objects that are outside of the field of view of the HMD; and
  continuously dropping the full state data representative of the artificial reality environment representing the view of the artificial reality environment that is generated prior to the time window, the view of the artificial reality environment including the data representative of the one or more objects that are within the field of view of the HMD and the data representative of the one or more objects that are outside of the field of view of the HMD; and
capturing, by a capture engine of the HMD in response to user input, the full state data representative of the artificial reality environment held in the buffer at a point in time at which the user input was received.

11. The method of claim 10, further comprising:
receiving, by the application engine, information indicative of a request to save the full state data representative of the artificial reality environment during the time window permanently in a memory; and
saving, by the application engine in response to receiving the information, the full state data representative of the artificial reality environment during the time window permanently in the memory.

12. The method of claim 11, further comprising one or both of:
replaying, using the HMD or another device, the permanently saved full state data representative of the artificial reality environment during the time window; or
uploading the permanently saved full state data representative of the artificial reality environment to one or more remote devices configured to host a social media account associated with the user in order to share the data with one or more other social media accounts connected to the social media account associated with the user.

13. The method of claim 10, further comprising:
receiving information indicative of a request to export, to one or more remote devices, the data representative of the artificial reality environment during the time window in order to share the full state data with one or more users of the one or more remote devices; and
exporting, in response to receiving the information, the full state data representative of the artificial reality environment to the one or more remote devices.

14. The method of claim 10, further comprising:
receiving information indicative of a request to export the full state data representative of the artificial reality environment during the time window to a content moderator system in order to report one or more rules infractions by at least one other user participating in the artificial reality environment; and
exporting, in response to receiving the information, the full state data representative of the artificial reality environment to the content moderator system.

15. The method of claim 10, further comprising:
capturing, using an image capture device, image data representative of a physical environment of the user;
identifying, by a gesture detector from the image data, a user interface (UI) activation gesture performed by the user in a field of view of the image capture device; and
rendering, by a rendering engine in response to identifying the UI activation gesture using the gesture detector, an options menu as an overlay to the artificial reality content for display on the HMD, wherein the options menu comprises a set of options.

16. The method of claim 15, further comprising:
identifying, from the image data, a user selection gesture performed by the user in a field of view of the image capture device, wherein the user selection gesture indicates a user selected option of the set of options; and
capturing, by the capture engine, the full state data representative of the artificial reality environment based on the user selected option.

17. A non-transitory computer-readable medium comprising instructions that, when executed, cause one or more processors to:
generate artificial reality content based on a pose of a user participating in an artificial reality environment;
output the artificial reality content to the user;
hold data representative of the artificial reality environment during a time window on a rolling basis, wherein the data representative of the artificial reality environment represents a view of the artificial reality environment from a position of the user, wherein the data representative of the artificial reality environment represents full state data that is more comprehensive than the artificial reality content output to the user, wherein the view of the artificial reality environment represents a 360 degree view of the artificial reality environment from the position of the user, wherein the view of the artificial reality environment includes data representative of one or more objects that are within a field of view of a head-mounted display (HMD) and data representative of one or more objects that are outside of the field of view of the HMD, and wherein to hold the data on the rolling basis, the instructions cause the one or more processors to:
  continuously save the full state data representative of the artificial reality environment representing the view of the artificial reality environment that is generated during the time window immediately preceding a current point in time, the view of the artificial reality environment including the data representative of the one or more objects that are within the field of view of the HMD and the data representative of the one or more objects that are outside of the field of view of the HMD; and
  continuously drop the full state data representative of the artificial reality environment representing the view of the artificial reality environment that is generated prior to the time window, the view of the artificial reality environment including the data representative of the one or more objects that are within the field of view of the HMD and the data representative of the one or more objects that are outside of the field of view of the HMD; and
capture the full state data representative of the artificial reality environment at a point in time at which the user input was received.

* * * * *